(12) United States Patent
Brown et al.

(10) Patent No.: US 11,921,837 B2
(45) Date of Patent: Mar. 5, 2024

(54) DYNAMIC SECURITY SEAL

(71) Applicant: DigiCert, Inc., Lehi, UT (US)

(72) Inventors: Leon Brown, San Jose, CA (US); Ryan Brown, Koosharem, UT (US); Jason Sabin, Lehi, UT (US)

(73) Assignee: DigiCert, Inc., Lehi, UT (US)

( * ) Notice: Subject to any disclaimer, the term of this patent is extended or adjusted under 35 U.S.C. 154(b) by 263 days.

(21) Appl. No.: 17/145,125

(22) Filed: Jan. 8, 2021

(65) Prior Publication Data

US 2022/0092168 A1 Mar. 24, 2022

Related U.S. Application Data

(60) Provisional application No. 63/081,960, filed on Sep. 23, 2020.

(51) Int. Cl.
| | |
|---|---|
| *G06F 21/00* | (2013.01) |
| *H04L 29/06* | (2006.01) |
| *G06F 21/44* | (2013.01) |
| *H04L 9/40* | (2022.01) |

(52) U.S. Cl.
CPC .......... *G06F 21/44* (2013.01); *H04L 63/0823* (2013.01)

(58) Field of Classification Search
CPC ....... G06F 21/44; G06F 21/16; H04L 63/0823
See application file for complete search history.

(56) References Cited

U.S. PATENT DOCUMENTS

| | | | |
|---|---|---|---|
| 7,092,912 B2 | 8/2006 | Khaishgi et al. | |
| 7,308,709 B1 | 12/2007 | Brezak, Jr. et al. | |
| 7,698,442 B1 | 4/2010 | Krishnamurthy et al. | |
| 8,234,632 B1 | 7/2012 | Hugeback et al. | |
| 8,407,802 B2 | 3/2013 | Ferg et al. | |
| 8,533,581 B2 | 9/2013 | Krall et al. | |
| 9,565,197 B1* | 2/2017 | Ran | G06F 21/64 |
| 9,712,532 B2 | 7/2017 | Krall et al. | |
| 2004/0064335 A1 | 4/2004 | Yang | |
| 2004/0153414 A1* | 8/2004 | Khaishgi | G06Q 20/12 |
| | | | 705/58 |
| 2004/0243802 A1 | 12/2004 | Jorba | |
| 2005/0065806 A1 | 3/2005 | Harik | |
| 2005/0160286 A1 | 7/2005 | Currie et al. | |
| 2006/0015722 A1 | 1/2006 | Rowan et al. | |
| 2007/0250919 A1 | 10/2007 | Shull et al. | |

(Continued)

OTHER PUBLICATIONS

Ownership verification—Search Console Help—Nov. 28, 2018—https://web.archive.org/web/20181128203454/https://support.google.com/webmasters/answer/9008080?hl=en (Year: 2018).*

*Primary Examiner* — Rodman Alexander Mahmoudi

(74) *Attorney, Agent, or Firm* — Baratta Law PLLC; Lawrence A. Baratta, Jr.; Ryan Odessa

(57) ABSTRACT

Features are disclosed for a dynamic security seal indicating a security of an application. A computing device can receive a request to implement a dynamic security seal for an application. The computing device can validate a relationship between an entity and the application and between an image and the application. Based on validating these relationships, the computing device can generate a dynamic security seal. When implemented, the dynamic security seal may display a plurality of faces. A face of the plurality of faces may be the image. The dynamic security seal can sequentially display the plurality of faces based on various criteria.

21 Claims, 9 Drawing Sheets

(56) References Cited

U.S. PATENT DOCUMENTS

| | | |
|---|---|---|
| 2007/0283291 A1 | 12/2007 | Morris |
| 2008/0294711 A1 | 11/2008 | Barber |
| 2009/0003588 A1 | 1/2009 | Ross |
| 2009/0077373 A1 | 3/2009 | Kramer |
| 2010/0030894 A1 | 2/2010 | Cancel et al. |
| 2010/0031022 A1* | 2/2010 | Kramer ............... H04L 63/1483 726/3 |
| 2010/0275012 A1 | 10/2010 | Kido et al. |
| 2010/0287180 A1 | 11/2010 | Kim et al. |
| 2010/0313248 A1 | 12/2010 | Krivosheev et al. |
| 2011/0055911 A1 | 3/2011 | Adelman et al. |
| 2011/0126292 A1 | 5/2011 | Ferg et al. |
| 2011/0254863 A1* | 10/2011 | Hoshino ................ G01C 21/36 345/660 |
| 2011/0283174 A1 | 11/2011 | M'Raihi et al. |
| 2012/0047581 A1 | 2/2012 | Banerjee et al. |
| 2012/0278876 A1 | 11/2012 | McDonald |
| 2013/0055403 A1 | 2/2013 | Pennington et al. |
| 2013/0269042 A1 | 10/2013 | Krall et al. |
| 2015/0149768 A1* | 5/2015 | Klieman ................ G06F 21/33 713/156 |
| 2019/0012821 A1* | 1/2019 | Bu .......................... G06F 8/61 |
| 2022/0245223 A1* | 8/2022 | Castelão Soares ......................... H04L 63/1483 |

\* cited by examiner

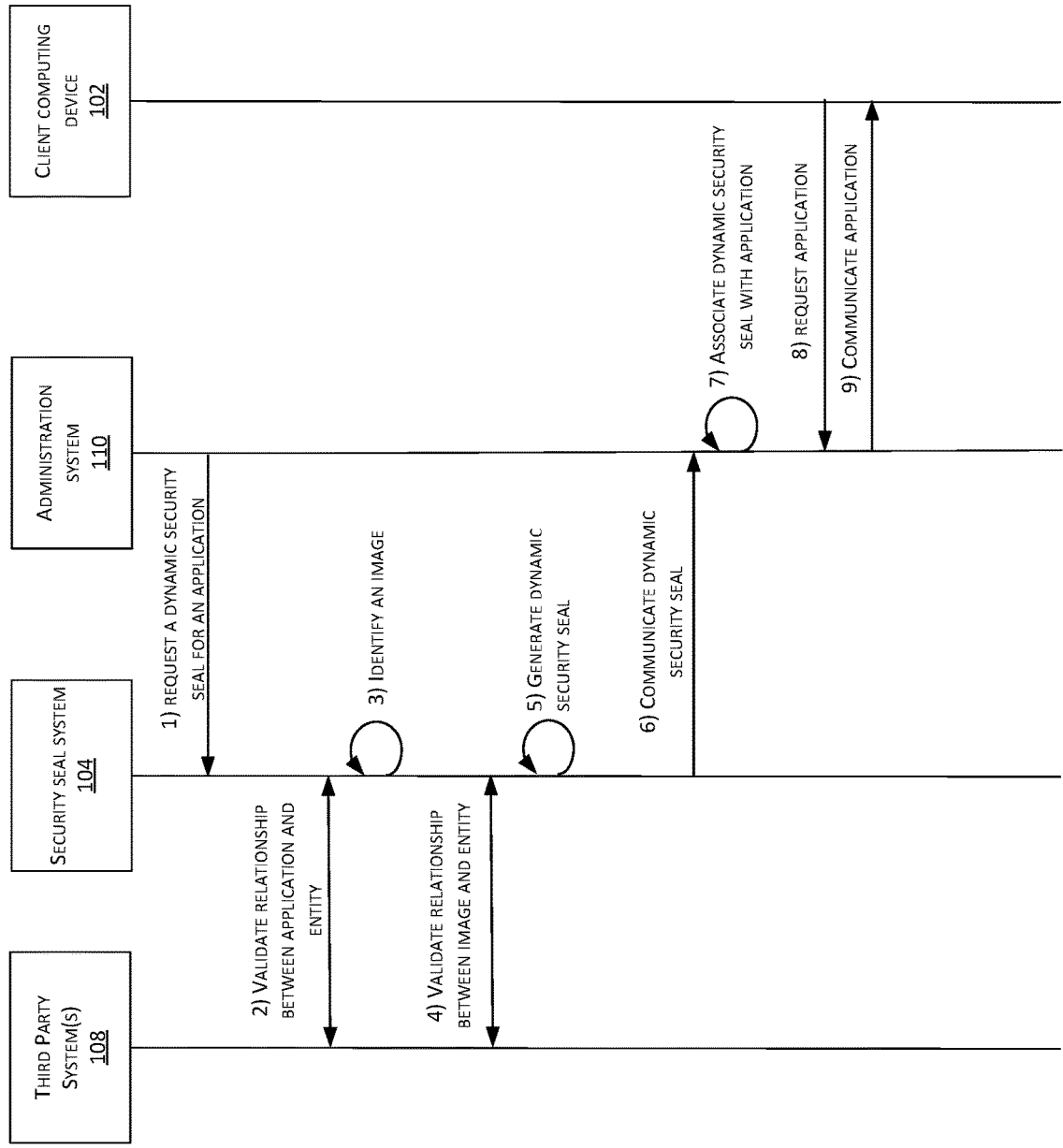

DYNAMIC SECURITY SEAL

RELATED APPLICATIONS

This application claims the benefit of priority of U.S. Provisional Patent Application No. 63/081,960, filed Sep. 23, 2020, entitled "DYNAMIC SECURITY SEAL," which is hereby incorporated by reference herein in its entirety and for all purposes.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 4 depicts an example workflow for providing a dynamic security seal according to some embodiments.

DETAILED DESCRIPTION

Figure 1:
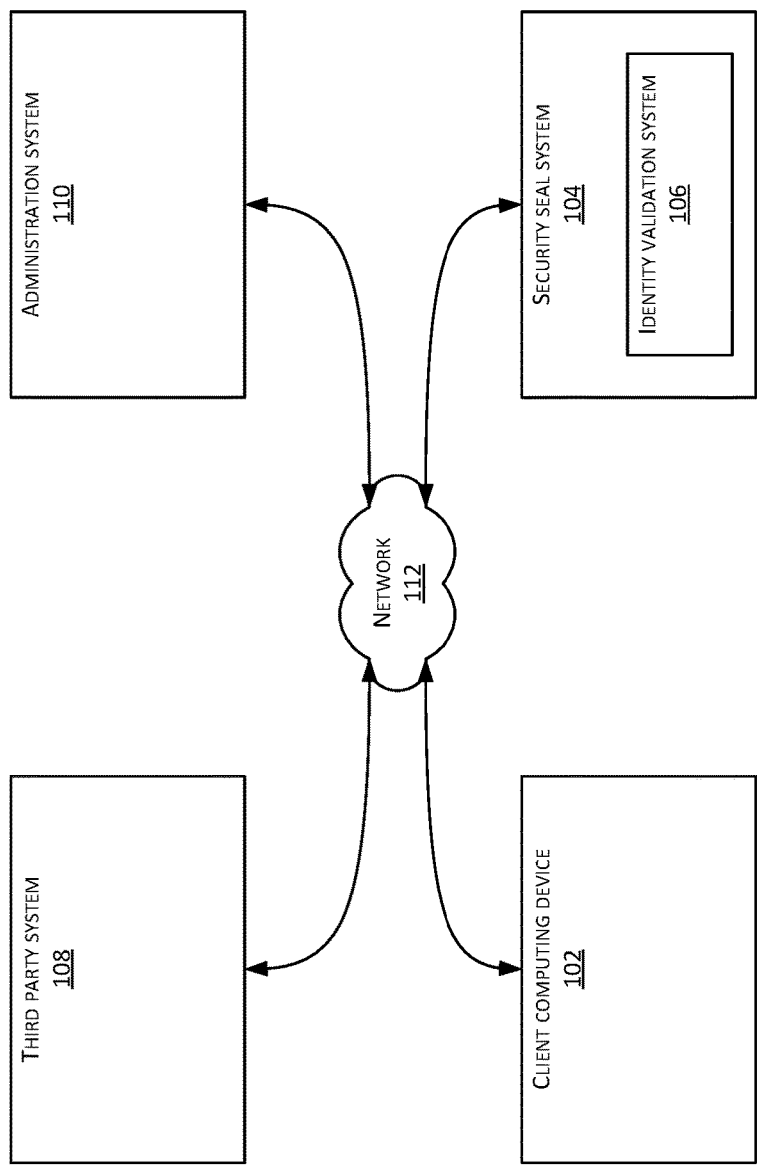
FIG. 1 depicts a schematic diagram of an example networked environment according to some embodiments.

In a networked environment with millions and billions of computers, internet of things ("IOT") devices, and/or other computing devices interconnected, it can be difficult to determine the trustworthiness of a (computer) application and/or its source. For example, with a minor typo of a website, a user may be taken to an untrusted website, or a website from a reputable company may have inadequate cybersecurity protections for users of the website, or the true source of a computer program may be questioned despite the computer program identifying a trusted company as its source.

In addition, given the billions of computers, IOT devices, and other computing devices regularly communicating with each other and the even larger number of computer programs and applications executing on these devices, it is impractical, if not impossible, for a human to attempt to review them and provide indications as to their trustworthiness. This becomes even less possible given highly dynamic nature of the digital environment and that these various applications are to be repeatedly validated and tested, and monitored to determine their trustworthiness over time.

In some cases, security seals (e.g., site seals, trust seals, secured seals, trust logos, or trust symbols) can be used to provide an indication of a level of trust for communications received from a computing system. Determining that internet communications are secure and can be trusted can be helpful as customers value secure communications that provide trusted interactions with a given application. In order to provide this indication and/or recommendation of a level of security, security seals can be displayed as part of the communications between computing systems, such as based on an interaction of a user with an application, to indicate a level of trust for an application associated with a given computing system.

Further, a user may interact with the security seal in order to verify information associated with the application in real time. Security seals can be displayed in order to verify information associated with any type of application including a computer application, a virtual reality application, a medical device application, an augmented reality application, a mobile device application, a motion graphics application, a heads-up representations, a gaming application, etc. Further, security seals can be displayed in order to verify information received via a computer application. For example, a user may receive, identify, and/or otherwise obtain information via an augmented reality application and a security seal may be displayed in order to verify the information.

In some cases, to obtain a security seal (e.g., a trust seal), an organization may provide certain information (such as entity information, logo information, code information, domain information, organization information, or any other information) to a security seal system (e.g., a seal authority). Based on the information provided by the organization, the security seal system may verify the information provided by the organization (e.g., verify that an organization associated with the application is in fact the organization). In verifying the organization, the security seal system may determine that a security seal may be associated with the application (e.g., displayed on the application or at startup of the application, etc.). Further, particular characteristics (e.g., the placement, presence, visibility, color, size, nature, etc.) of the security seal on the application can indicate to users who are interacting with the application that the organization and/or the application is secure. For example, the security seal may indicate the validity of a digital certificate associated with the application. Further, the security seal may indicate the certificate authority that issued the particular digital certificate associated with the application. In order to indicate the validity of the digital certificate, the security seal may provide an indication of the certificate authority that has verified the application and the digital certificate.

In some cases, however, the security seal may be static and may not change even if the underlying application or entity is no longer safe or reliable. Further, in some cases, the security seal may only have one face, which displays the logo of the certificate authority that performed the underlying validations for the security seal.

Accordingly, in certain cases, a dynamic security seal can be used to provide an indication of a level of trust for an application. The application may be any computer application that is executable by a computing device, such as a microprocessor. For example, the application may be a website, a computer program, a mobile device application, virtual reality application, a medical device application, an augmented reality application, a mobile device application, a motion graphics application, a heads-up representations, a gaming application, video or audio data, all or a portion of an operating system, virtual machine, container, pod, etc. In certain cases, such as where the application is a computer application, the application may include source code or object code that when executed implements the computer program, operating system, or the like. In certain cases, the application may be an electronic message, such as an email, SMS, social media post or message, etc.

In some cases, the dynamic security seal can be displayed on the application (e.g., on a website or email message) or when an application or computing device that uses the application is started (e.g., on a splash screen when a computer or medical device is booted up or when a computer application is identified for execution). In some examples herein, specific reference is made to a dynamic security seal being displayed on a website or webpage, however, it will be understood that the dynamic security seal can be used in a variety of applications, including, but not limited to, computer software programs, mobile device applications, operating system, electronic message, etc.

The dynamic security seal can identify and/or collate a set of verifications or validations associated with an application. In some cases, the appearance of the dynamic security seal can change based on various inputs or information, such as the results of ongoing and/or historical security checks, timing, and/or interactions with a user. In some cases, the appearance of the dynamic security seal can change based on a change to the level of trust for the application associated with the dynamic security seal. For example, the appearance may change based on security vulnerabilities detected via a vulnerabilities scan, communications received from the application, a scan of the application, etc.

In some cases, the appearance of the dynamic security seal can change to provide additional information about the level of trust for the application or to provide additional information. Each different appearance of the dynamic security seal may be referred to as a "face" of the dynamic security seal. In certain cases, the dynamic security seal can display different faces depending on various inputs, such as the results of security checks, timing, or user interactions. Each face may include different information. For example, one face can identify the certificate authority that provided the security seal, another face can display information about a digital certificate (e.g., validity, expiration, etc.) or other security information associated with the application or entity associated with the application, and yet another face can include an entity image that has been validated as being associated with the entity that controls, is the source of, or otherwise related to the application.

In some cases, different faces of the dynamic security seal can be cycled through such that different faces are displayed at different times or based on certain factors (e.g., user interaction with the displayed dynamic security seal, a failed validation or safety test, etc.). In certain cases, a particular face of the security seal may include one or more images (e.g., a still image, a word mark, one or more words, one or more letters, a video, GIF file, a motion representation, a graphical representation, a non-trademarked representation, animation, a sound, a holographic image, etc.) associated with an entity that is the source of, associated with, or controls the application (also referred to herein as the "entity image"). The display of the entity image on a face of the dynamic security seal can provide an additional indication to a user of the level of trust for the application.

In some cases, the appearance of the dynamic security seal can change or a different face can be selected based on one or more security checks. For example, the results of repeated security checks done on the application or validations performed on the entity associated with the application or certificates associated with the application, can be fed into a dynamic security seal engine. Based on the information in the dynamic security seal engine, the appearance of the dynamic security seal can be altered. For example, if the security of the application is determined to be unsatisfactory or there are errors associated with the identity information of the entity associated with the application, the appearance of the dynamic security seal can change from one face that indicates that the webpage is safe to another face that indicates that the webpage is unsafe. In certain cases, the reasons for the change can be provided in the security seal. For example, the dynamic security seal can indicate why the application is no longer safe (e.g., expired certificate, identity information issues or other errors).

Different faces of the security seal can be displayed cyclically or sequentially based on a timer or user interaction. For example, if a user hovers over, clicks on, or otherwise interacts with the dynamic security seal, the face of the security seal may change from one face that displays a logo associated with the certificate authority that provided the security seal to a different face that includes a logo of the entity (or other image associated with the entity) associated with the application. As yet another example, the face of the dynamic security seal may change to display different faces every ten seconds.

In some cases, to implement the dynamic security seal, a security seal system may provide computer-executable instructions or code that can be linked with or embedded into an application (e.g., as part of the hypertext markup language ("HTML") or other code of the application). Execution of the computer-executable instructions or executable code within the application (e.g., by to client computing device) can cause the dynamic security seal to be displayed with or on the application. In some cases, the dynamic security seal may be placed over the entire application, a portion of the application, an entire webpage, or a portion of a particular webpage. For example, the security seal may be placed at the bottom right corner of a webpage. The computer-executable instructions of the dynamic security seal (also referred to herein dynamic security seal computer-executable instructions) can also provide instructions regarding which face of the dynamic security seal should be displayed based on underlying conditions, the timing and frequency of security checks, a duration of time, etc.

In certain cases, the dynamic security seal may provide an indication of when a given connection or application can be trusted. For example, one face of the dynamic security seal can indicate that a connection or application should be trusted. Further, the dynamic security seal can indicate that the application or connection cannot be trusted. For example, the dynamic security seal engine may determine that the information associated with the application and/or organization can no longer be verified and update the dynamic security seal to indicate this determination. The dynamic security seal can be updated by instructing the dynamic security seal to alter its appearance, such as be selected a different face, communicating additional computer-executable instructions to be included with or to replace the previously sent computer-executable instructions (where the additional computer-executable instructions cause the appearance of the dynamic security seal to change), etc.

In order to improve the comprehension of security between the customer and the application, it can be advantageous to provide additional information about the application and/or the organization via the dynamic security seal that further illustrate a level of trust that should be associated with a particular application. The dynamic security seal can display information associated with particular validations associated with the security seal. For example, the security seal may provide additional information such as identity information and security information including checks or analysis performed by the security seal system or certificate authority of the domain, the organization, and the connection. The addition of such information provides additional indications to a user interacting with the application of the security of the application. As mentioned, in some cases, this information can be included in one or more faces of the security seal.

As mentioned, in certain cases, a security seal system can provide a dynamic security seal with one or more faces that include an entity image (e.g., a logo, trademark, or other image data) associated with the organization and/or the application. The image may be placed on the dynamic security seal such that a user interacting with the particular application may see the image, providing a further indication of security as the image is associated with the application. In verifying that the security seal can include a particular image, the security seal system may verify that the particular image is associated with a particular organization or application. For example, the security seal system may verify that the particular image is associated with a particular organization associated with the application based on trademark data. The security seal system may parse trademark data in order to verify that the particular image is indeed associated with the particular organization. Upon verification, the security seal system may place the image in the security seal or as part of a face of the security seal. In some embodiments, verification of the image may not occur or may occur by another entity. The use of an image associated with the application in a seal associated with a security seal system, provides additional security and validation that additional security and identity challenges have been satisfied. Additionally, the display of a logo, image, image mark, word mark, or other identifier associated with the entity and validated by the security seal system provides an indication of the security and validation of the application. This provides an increased comprehension, for a user of an application, of the safety and security efforts that have been implemented by the application.

In light of the description above, it will be understood that the embodiments disclosed herein substantially increase Internet, network, and application security. Specifically, the embodiments disclosed herein enable a system to generate, use, display, and update a dynamic security seal to indicate the security, safety, and/or trustworthiness of an application.

The ability to generate, use, display, and update a dynamic security seal based on real-time data and dynamic conditions of an application and the entity associated with the application enable the underlying network systems to more efficiently communicate in a trusted manner, thereby reducing illicit behavior on the Internet. Specifically, the dynamic security seal can provide a user and underlying computer systems real-time information regarding what level of trust should be placed in a given application executing on a computing device. In some embodiments, the dynamic security seal can provide a user and underlying computer systems non-real-time (e.g., periodic or asynchronous) information regarding what level of trust should be placed in a given application. Thus, the presently disclosed embodiments represent an improvement in the functioning of Internet and network communications, as well as application security. Moreover, the presently disclosed embodiments address technical problems inherent within the Internet and network systems; specifically, how to determine whether a given application can be trusted at any given time and how to indicate a change in trustworthiness of an application. These technical problems are addressed by the various technical solutions described herein, including the inclusion of computer-executable instructions within an application that enable a site seal to dynamically alter its appearance based on changing environmental conditions. Thus, the present application represents a substantial improvement on existing network, Internet, and application security in general.

FIG. 1 depicts an example security seal issuance environment 100 including a security seal system 104 in which the disclosed dynamic security seal can be implemented. The security seal system 104 can communicate with a client computing device 102 over a network 112. Further, the security seal system 104 and/or the client computing device 102 can communicate with a third party system 108 and/or an administration system 110 over the network 112. The security seal system 104 can include an identity validation system 106. In some embodiments, the security seal system 104 can include a security validation system, a domain validation system, an organization validation system, or any other validation system. Using the identity validation system 106, the security seal system 104 can provide code to the administration system 110 to provide a dynamic security seal to the client computing device 102 via the network 112. The security seal system 104 may further communicate with the third party system 108 in order to obtain additional security information. For example, the third party system 108 may include third party security information databases and the security seal system 104 may obtain security information for provision of the dynamic security seal for the client computing device 102. Each system can illustratively include hardware computer memory and/or processors, an operating system that provides executable program instructions for the general administration and operation of that system, and a computer-readable medium storing instructions that, when executed by a processor of the system, allow the system to perform its intended functions.

The client computing device 102 may include one or more servers to provide computing capacity to users for building and hosting their software systems. Users can use the servers to launch and host different computing environments. Each computing environment can have various configurations of processing power, memory, storage, and networking capacity depending upon user needs. A user may use the client computing device 102 to access the network 112 (e.g., the Internet). The client computing device 102 may request a given application from the administration system 110 and upon receiving code corresponding to the application, cause the application to be presented to the user.

The security seal system 104 can be implemented as one or more computing devices, such as one or more servers (such as a cluster of servers on the cloud), virtual machines, containers, a gateway, etc. The security seal system 104 can be located remotely from or locally to the client computing device 102, the administration system 110, and/or the third party system 108. In some embodiments, the security seal system 104 is a trusted entity that can certify or authenticate a particular application and/or entity, and perform various functions including, but not limited to, provisioning a corresponding security seal, indicating the level of trust that should be associated with the application and/or the entity. For example, the security seal system 104 may be or may be associated with a vetting entity such as a certificate authority or a security seal system. The security seal system 104 may periodically update the security seal associated with the application and/or the entity. In periodically updating the security seal associated with the application, the security seal system 104 can generate and provide updated security seal code. In some embodiments, in order to update the security seal associated with the application, the security seal code, when executed, can cause the security seal to be periodically updated. For example, the security seal code can cause security information and/or identity information associated with the entity, the application, and/or the user to be validated periodically. In other embodiments, the security seal code can cause the additional validations to be requested from the security seal system 104 and, in response, the security seal system 104 may perform the additional validations and provide the additional validations as additional security seal code. In other embodiments, the security seal system 104 may perform the additional validations and provide an updated face to be displayed by the security seal. Further, the security seal system 104 may provide security seal code to the client computing device 102 such that the security seal is displayed with information associated with a corresponding application (e.g., a corresponding website) on a user interface of the client computing device 102.

The security seal system 104 can also store validation information for validating the identity of the application, a user, and/or the entity, including, but not limited to, security information, image information (e.g., logo information), domain information, organization information, or any other validation information. For example, the security seal system 104 can verify that code corresponding to the application is signed by a particular entity. Further, the security seal system 104 can verify the boot sequence for a particular computing device implementing the application. The security seal system 104 can further store policies, such as security seal policies for validating applications and/or entities based on the validation information. For example, the security seal policies may indicate a level of trust that should be associated with a particular application and/or entity based on the associated validation information. Further, the security seal system 104 can also store a list of validated applications and/or entities. These validated applications and/or entities can include applications and/or entities validated within a particular time period. In some embodiments, a prior validated application may be revalidated by the security seal system 104 to ensure that the prior validation should be maintained and that the security seal corresponding to the prior validation should be maintained at a first state. For example, the security seal system 104 can periodically revalidate a prior validated application in order to verify that the security seal can be maintained. If the security seal system 104 is unable to revalidate the prior validated application, the security seal system 104 may update the security seal (e.g., by updating the security seal code and/or sending a relevant instruction that is interpreted using the security seal code) to show that the security seal system 104 has not revalidated the application. The identity validation system 106 can validate the identity of the application, the image, and/or the entity by performing one or more identity validation operations. For example, the identity validation system 106 can perform transport layer security (TLS) validation, security encryption validation, website owner identity validation, image validation, etc.

The third party system 108 can be implemented as one or more computing devices, such as one or more servers (such as a proxy server or a cluster of servers on the cloud) virtual machines, containers, a gateway, etc. The third party system 108 can be located remotely from or locally to the client computing device 102, the administration system 110, and/or the security seal system 104. The third party system 108 may perform various functions including, but not limited to, providing security information, providing identity information, generating and/or maintaining code associated with an application, and the like.

The administration system 110 can be implemented as one or more computing devices, such as one or more servers (such as a proxy server or a cluster of servers on the cloud), virtual machines, containers, a gateway, etc. The administration system 110 may communicate with one or more of the security seal system 104 and/or the third party system 108 to obtain certain information for presentation to a user via a user interface associated with the client computing device. For example, the administration system 110 may obtain application code from a third party system 108 and obtain security seal code associated with a security seal for the application and/or an entity associated with the application from a security seal system 104. The security seal code may be associated with or embedded into the application code, such that when the application code is executed the particular security seal is displayed in the user interface.

As illustrated in FIG. 1, the client computing device 102, the security seal system 104, the third party system 108, and the administration system 110 can communicate over the network 112. The network 112 can include any appropriate network, including an intranet, the Internet, a cellular network, a local area network or any other such network or combination thereof. In the illustrated embodiment, the network 112 is the Internet. Protocols and components for communicating via the Internet or any of the other aforementioned types of communication networks are known to those skilled in the art of computer communications and thus, need not be described in more detail herein. The client computing device 102 may further include user computing devices that can include any network-equipped computing device, for example desktop computers, laptops, smartphones, tablets, e-readers, gaming consoles, and the like. Users can access the security seal issuance environment 100 via the network 112 to view or manage their data and computing resources, as well as to use applications.

Figure 2:
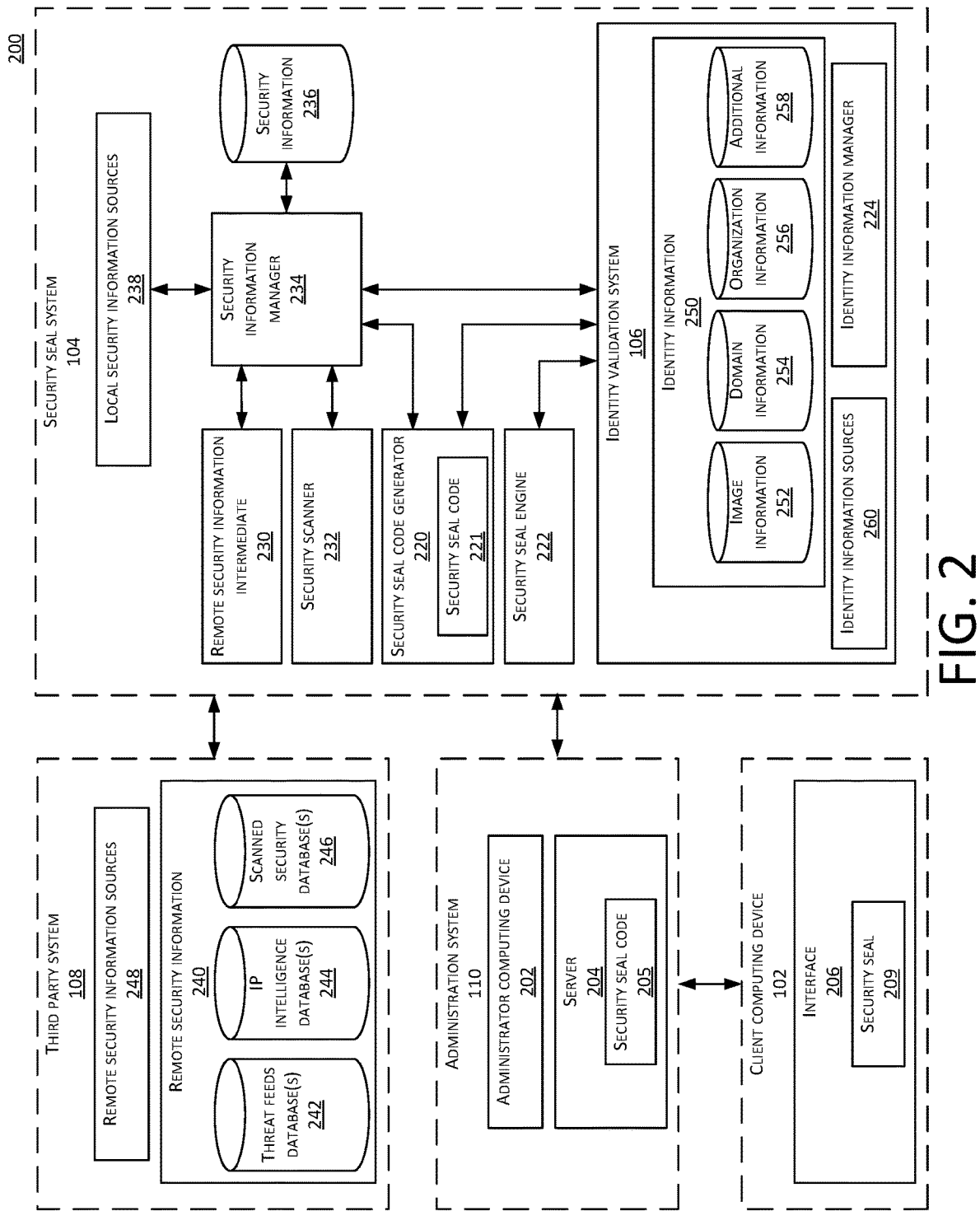
FIG. 2 depicts a schematic diagram of an example networked environment according to some embodiments.

FIG. 2 is a block diagram illustrating an embodiment of various computing systems in a security seal issuance environment 200. In the illustrated embodiment, the environment 200 includes an administrator computing device 202, a server 204 (e.g., an http server), security seal code 205, a user interface 206, a security seal 209, a security seal code generator 220 (also referred to herein as (dynamic) security seal code generator 220 or a smart seal code generator), security seal code 221, a security seal engine 222, an identity information manager 224 (also referred to herein as an identity handler 224), a remote security information intermediate 230 (also referred to herein as a security data gatherer 230), a security scanner 232 (also referred to herein as a direct security scanner 232), a security information manager 234 (also referred to herein as a security data handler 234), security information 236 (also referred to herein as security data 236), local security information sources 238, remote security information 240 (also referred to as third party services 240) (including threat feed database(s) 242, internet protocol ("IP") intelligence database(s) 244, and scanned security database(s) 246), remote security information sources 248, identity information 250 (also referred to herein as identity validation data 250) (including image information 252, domain information 254, organization information 256, and additional information 258), and identity information sources 260.

The client computing device 102 may include one or more of the interface 206 and the security seal 209 In some embodiments, the client computing device 102 may include more, less, or different components.

The security seal system 104 may include one or more of the security seal code generator 220, the security seal code 221, the security seal engine 222, the remote security information intermediate 230, the security scanner 232, the security information manager 234, the security information 236, or the local security information sources 238. In some embodiments, the security seal system 104 may include more, less, or different components. The identity validation system 106 of the security seal system 104 may include one or more of the identity information manager 224, the identity information 250, the image information 252, the domain information 254, the organization information 256, the additional information 258, or the identity information sources 260. In some embodiments, the identity validation system 106 may include more, less, or different components.

The third party system 108 may include one or more of the remote security information 240, the threat feed database(s) 242, the IP intelligence database(s) 244, the scanned security database(s) 246, or the remote security information sources 248. In some embodiments, the third party system 108 may include more, less or different components.

The administration system 110 may include one or more of the administrator computing device 202, the server 204, or the security seal code 205. In some embodiments, the administration system 110 may include more, less, or different components.

Any one or any combination of the components shown and described in FIG. 2 can each be implemented using one or more computing devices, such as, but not limited to one or more servers, processors, computing devices, virtual machines, etc., and communicate via a network to request a security seal, verify and confirm identity and security data, issue a security seal, and update/monitor the security seal. The network can be a local area network (LAN) or wide area network (WAN), such as the Internet.

The identity information manager 224 and the security information manager 234 can be distinct entities. In some embodiments, the identity information manager 224 and the security information manager 234 can be the same entity. The identity information manager 224, the security information manager 234, the security seal code generator 220, the security seal engine 222, the security scanner 232, and the remote security information intermediate 230 may be distinct computing devices. In some embodiments, one or more operations performed by one or more of the identity information manager 224, the security information manager 234, the security seal code generator 220, the security seal engine 222, the security scanner 232, and the remote security information intermediate 230 may be performed by the same entity. For example, the remote security information intermediate 230 and the security information manager 234 may be the same computing device.

The remote security information 240 may be databases storing information such as threat feeds databases, internet protocol (IP) intelligence databases, or scanned security databases. The remote security information 240 may be information received from one or more remote security information sources 248.

Each of the image information 252, domain information 254, organization information 256, and additional information 258 can include publicly or privately available information related to various computing systems or entities (e.g., person or commercial entity), including the application and an associated organization. For example, the domain information 254 can be a third-party database that includes publicly available information about commercial entities, such as the official name, domain names owned by, addresses, phone numbers, etc., of the commercial entities. In some embodiments, the domain information 254 can be one or more government-sponsored databases or computing systems, such as the commercial registries of a state secretary of state, the securities exchange commission (SEC), government clearing houses, internal revenue service (IRS), etc. The image information 252 may be one or more government-sponsored databases or computing systems, such as a state trademark registry, a national trademark registry, etc.

The administration system 110, using the administrator computing device 202, can implement an application via the server 204 and the interface 206. In some embodiments, the administration system 110 may not implement the application via the server 204 and the interface 206. Instead, the administration system 110 can provide the application to the client computing device 102. The application and/or the administrator computing device 202 can be associated with an entity that desires a security seal 209, such as, but not limited to a dynamic security seal 209 including a logo associated with the entity. In some embodiments, the requested security seal 209 may be for the application or for another computing system, domain name, application, code, entity, etc., associated with the administrator computing device 202.

As part of providing a dynamic security seal 209 for a given application, the administration system 110 may embed security seal code 205, implemented as computer executable instructions, in an application that cause a security seal 209 be displayed on a display of a given application and/or client computing device 102 when executed. The administration system may embed the security seal code 205 in the code of an application. The administrator computing device 202 may further designate a server 204 associated with the application for which code 205 associated with the security seal 209 should be provided. The server 204 may be the same server that is providing the code for a given application. In some embodiments, the application and the security seal 209 may be provisioned by separate servers. Upon verification of the entity, the security seal may be provided to the server 204 such that the security seal code 205 can be deployed by the administration system 110 to the client computing device 102. Based on the deployment of the security seal code 205 by the administration system 110 to the client computing device 102, an interface 206 associated with the client computing device 102 may display the security seal 209. In some cases, where the application is a website, a user navigating to the application via a computing device or any other device (e.g., by browsing to a uniform resource locator (URL) and/or uniform resource identifier (URI) address associated with the application) may be provided the security seal 209 upon loading of the application. The server 204 may load the security seal code 205 for execution as the application is loaded for display such that the security seal 209 is displayed simultaneously with the application. In some embodiments, the security seal 209 may be displayed after the application is loaded. Reference herein to displaying the security seal 209 may also refer to displaying one or more faces of the security seal 209.

As described herein, the security seal 209 may be a dynamic security seal. In some cases, interactions of a user with the security seal 209 may result in the modification of the security seal 209 being displayed. For example, based on an interaction by the user with the security seal 209, additional information may be displayed within the security seal 209 or a different face of the security seal 209 may be displayed (e.g., a second security seal face). The additional information may include one or more of security information, identity information, or other information associated with the entity or the application. Further, based on a subsequent interaction by the user with the security seal 209, a logo associated with the entity or the application, may be displayed. The logo may be displayed with additional logo information such as trademark information. The additional information may be displayed based on a first interaction with the security seal 209 and the logo may be displayed based on a second interaction with the security seal 209. In some embodiments, a first face of the security seal 209 may display particular information, a second face of the security seal 209 may display additional information, and a third face of the security seal 209 may display the logo. It will be understood however, that the faces of the security seal 209 can be viewed in any order depending on, for example, the security seal computer-executable instructions embedded in the application. In certain cases, the security seal 209 may not change based on interactions of the user.

In certain cases, the dynamic security seal 209 may be modified (e.g., change its face or display different images or information) based on the security information manager 234 or the identity information manager 224, results of a security check (e.g., indicate that a validation or security check has failed, etc.), or time intervals (e.g., cycle through different faces every fifteen seconds).

As part of generating the security seal 209, the administration system 110 may provide a request to the security seal system 104 for the security seal 209. In other embodiments, the request for the security seal 209 may be provided by the entity associated with the application or a different entity. The request to the security seal system 104 may include information about the entity associated with the application or the application. Further, the request may include a request that the security seal 209 include image information 300. The security seal system 104 may therefore receive a request from the administration system 110 for a security seal 209.

As noted above, the security seal system 104 may receive the request for the security seal 209, and the identity information manager 224 may validate information associated with the application or the entity based on the security information 236 or the identity information 250. The validation of the information may be in response to the request for the security seal 209. In some embodiments, the validation of the information may occur before receipt of the request for the security seal 209. For example, the validation of the information may occur based on a provision of the application, a request for validation of a different application associated with the same organization or entity, etc. Further, the validation may occur at any time before the request is received (e.g., hours, days, months, years, etc. before the request). For example, the identity information manager 224 may obtain pre-validated information from one or more of the security information 236 or the identity information 250. The pre-validated information may include validations that were conducted prior to receiving the request by the identity information manager 224, any other component of the security seal system 104, or a component of the third party system 108. In some embodiments, the identify information manager 224 may, for a first portion of the information, validate the information and, for a second portion of the information, obtain pre-validated information. Therefore, the identity information manager 224 may verify the information at the time of the request or before the request.

The identity information manager 224 may collect the identity information 250 from one or more identity information sources 260 and the security information manager 234 may collect the security information from one or more of the local security information sources 238, the remote security information intermediate 230, or the remote security information sources 248. One or more of the security information intermediate 230, the local security information sources 238, the remote security information sources 248, or the identity information sources 260 may be public databases and/or third-party business information sources. In some embodiments, the security information intermediate 230, the local security information sources 238, the remote security information sources 248, or the identity information sources 260 may be any sources of information. One or more of the identity information manager 224, the remote security information intermediate 230, the security information manager 234, or a vetting entity may subsequently validate the data received for the application and/or the entity. For example, the identity information manager 224 may validate that the domain of the application matches the domain information 254, the organization associated with the application matches the organization information 256, etc. One or more of the identity information manager 224, the remote security information intermediate 230, the security information manager 234, or a vetting entity may validate the application and/or the entity in order to investigate and authenticate that the request for the security seal 209 is from the individual that is claiming to make the request and that such an individual is authorized within the organization to make such a request. Further validation may occur based on the entity's server information, business entity information, contact information, each of which may be verified to verify the identity of the entity. Further, the entity may provide identity information to the identity information manager 224, with or separate from the request for the security seal 209, in order to verify that the entity associated with the request is the entity.

Additional verification processes may occur such as image verification. As noted above, the image information 252 may include a trademarked image or images otherwise verified or validated by an identity information source 260 as being associated with an entity (e.g., owned by, used by, etc.). For example, a given identity information source 260 may validate that a given image is associated with a given entity. Such image information 252 may be used by the identity information manager 224 or another vetting entity in order to verify an association of an image with an entity. In some embodiments, the identity information manager 224 may verify the image based on an analysis of the image information 252. For example, the identity information manager 224 can verify the association based on a given trademark database (e.g., the United States ("US") trademark database), an industry standard such as Brand Indicators for Message Identification ("BIMI"), or any other manner of verifying an association of a logo with an entity. As previously noted, in some embodiments, a given image may not be verified for a given entity. The verified logo may further be stored as image information 252 in order to indicate that a given application is associated with a particular entity.

Results of the validation of the identity information for a given application or entity can be stored as identity information 250. The identity information 250 can include image information 252, domain information 254, organization information 256, and additional information 258.

The image information 252 may include image information (e.g., information based on the BIMI, trademark database, or other image verification information). Further, the image information 252 may include logo information for a plurality of entities. For example, the image information 252 may include a particular logo, image, etc. for each entity of a plurality of entities. In some embodiments, a particular entity may be linked to multiple logos or images. For example, a particular entity may be associated with multiple trademarks. The domain information 254 can include the domain URL data and the vetted data that is performed in a typical publicly trusted transport layer security (TLS) cert. In some embodiments, the domain information 254 may correspond to a validation of a TLS certificate. In some cases, the domain information 254 may indicate that an identity information source 260 has confirmed that an entity has control over the particular domain through whois records, domain name system records, email hosting accounts, or web hosting accounts of the domain.

The organization information 256 can include information related to the organization that is associated with and/or operating the application. For example, the organization information 256 may indicate vetted and/or confirmed organization information 256. The additional information 258 may include information such as individual identity information, country specific identity information, or any other identity information. Each piece of stored identity information 250 may further be used by the identity information manager 224 to verify/validate a given application and/or the security seal 209.

The identity information manager 224 may obtain the image information 252 (e.g., logo information), the domain information 254, the organization information 256, and the additional information 258 for the security seal 209. The identity information manager 224 may gather the information that may be displayed as part of the security seal 209 in order to verify the entity and/or application.

The identity information manager 224 may further request security information 236 to be displayed with the security seal 209. In some embodiments, a portion of the identity information 250 and/or the security information 236 can be displayed within the security seal 209 (e.g., on one or more faces based on the security seal computer-executable instructions embedded in the application). The identity information manager 224 may request security information 236 from the security information manager 234. The security information manager 234 may further receive identity information 250 from the identity information manager 224 such as image information 252, domain information 254, organization information 256, or additional information 258. In some embodiments, the security information manager 234 may separately receive identity information or may otherwise validate an identity separate from the identity information manager 224. The security information manager 234 may use the identity information 250 to obtain the security information 236. For example, identity information 250 may include a domain and the domain may be used by the security information manager 234 to obtain security information 236 associated with the domain. Further, identity information 250 may include an organization and the organization may be used by the security information manager 234 to obtain security information 236 associated with the organization.

The security information manager 234 may be in communication with a security scanner 232 in order to perform further security checks on the entity and/or the application. The security scanner 232, based on receiving a request from the security information manager 234, may perform security tests, penetrations tests, and scans of a domain associated with the application. For example, the security scanner 232 may scan the server 204. The results of the tests and/or scans performed by the security scanner 232 may be stored as security information by the security scanner 232 or the security information manager 234. Further, the security information obtained by the security information manager 234 and/or the security scanner 232 may be displayed via the security seal 209 (e.g., on one or more faces based on the security seal computer-executable instructions embedded in the application).

As described herein, in some cases, the security information 236 may be used to update the appearance of the security seal 209 (e.g., change its face) and may be used to modify the security seal 209 based on additionally received material. For example, the security scanner 232 may be scheduled to perform periodic scans (e.g., scans every minute, hour, day, week, or any interval of time) on the domain associated with the server 204. Therefore, the security scanner 232 may scan the server 204 in order to perform a security check on the domain.

The security information manager 234 may further receive security information from the remote security information intermediate 230. The remote security information intermediate 230 may gather remote security information 240 from the third party system 108. The third party system 108 may include one or more remote security information sources 248 to provide remote security information 240. In some embodiments, the remote security information sources 248 may be data sources associated with the entity. The remote security information 240 may include one or more of threat feeds databases 242, IP intelligence databases 244, scanned security databases 246, or other security databases. The remote security information intermediate 230 may periodically obtain remote security information 240 from the remote security information sources 248 (e.g., hourly, daily, weekly, monthly, etc.) and pass the remote security information 240 to the security information manager 234. The security information manager 234 may update the security information 236 based on newly received remote security information 240. The security information manager 234 may further receive local security information from local security information sources 238. The local security information sources 238 may provide (e.g., periodically) the local security information. In some embodiments, the local security information sources 238 may be local to one or more of the client computing device 102, the security seal system 104, the identity validation system 106, or the third party system 108. The security information obtained by the security information manager from the remote security information intermediate 230, the security scanner 232, the local security information sources 238, and the remote security information sources 248 may be stored as security information 236. The security seal 209 may be displayed and/or updated based on the security information 236. For example, the security information 236 may be used to update the security seal 209 to update a risk change associated with a given application and/or entity (e.g., display different or additional information and/or display a different face of the security seal 209). Further, the security information 236 may be stored such that historical information within the security information 236 may be displayed in the security seal 209. Such a use of the remote security information intermediate 230, the security scanner 232, the security information manager 234, the local security information sources 238, and the remote security information sources 248 may allow the security seal 209 to display updated security information associated with the application and/or the entity.

As noted above, the security information manager 234 may obtain security information 236 and the identity information manager 224 may obtain identity information 250 for use in generating the security seal 209. One or more of the security information manager 234 or the identity information manager 224 may be in communication with the security seal code generator 220 in order to generate security seal code 221 that corresponds to the requested security seal 209. The security seal code generator 220 may provide the security seal code 221 to the administrator computing device 202 for execution via a server 204 as security seal code 205. For example, the security seal code generator 220 may provide computer-executable code such that when the code 205 is executed by a computing device (e.g., server 204), the dynamic security seal 209 is displayed (e.g., displayed on a given application). The code 205 for the security seal 209 may cause the appearance of the security seal 209 to change based on changing environmental conditions (e.g., may cause the presentation of a different face of the security seal 209). For example, the code 205 of the security seal 209 may include a timer which causes the security seal 209 displayed on the application to change or be modified. As another example, the code 205 of the security seal 209 may monitor user interaction with the security seal 209 and cause the display of the security seal 209 to change based on the user interaction. As yet another example, the code 205 of the security seal 209 may monitor security checks or and update the security seal 209 based on the security checks. In some cases, the code 205 may check with another component to determine what should be displayed as the security seal 209 (e.g., which face should be displayed). For example, the logic regarding what should be displayed as part of the security seal 209 and when it should be displayed may reside with the security seal code generator 220 or security seal engine 222. In some such cases, the code 205 of the security seal 209 embedded in the application may include instructions to periodically check with the security seal code generator 220 or security seal engine 222 to determine what should be displayed as the security seal 209 and when the security seal 209 should be modified (e.g., or when different faces should be used and what could be on the different faces). In some such cases, the security seal code generator 220 or security seal engine 222 may send updated code 221 to the server 204 for inclusion in the application. Such updates may replace parts or all of the code 205 already residing thereon and may be used to modify the security seal 209 or change the face of the security seal 209.

As noted above, based on the code 221 generated by the security seal code generator 220 and provided to the server 204, the security seal 209 may be displayed on application. In order to interact with the security seal 209, a user can interact with a domain URL corresponding to the application which causes a server 204 to deploy the application. As noted above, the code 205 for the security seal 209 may enable a dynamic security seal 209 that is updated periodically based on new information or changing environmental conditions. In certain cases, the code 205 itself may be dynamic and be updated periodically based on received information from the security seal engine 222 and/or security seal code generator 220. The security seal engine 222 may gather security information and/or identity information from the identity information manager 224 and/or the security information manager 234. Based on the new data being gathered, the code 205 of the security seal 209 may be updated such that the security seal 209 as displayed on the server 204 is modified. For example, new security seal code can be generated by the security seal code generator 220, communicated to the administration system 110, and included in the application.

The security seal 209 may be a multi-faceted seal. For example, the security seal 209 (i.e., the security seal 209 being displayed on the application) may include multiple faces such that a display of the security seal 209 progresses from a first face to a second face, from the second face to a third face, etc. Further, each face of the security seal 209 may be a distinct appearance or display of the security seal 209. The security seal 209 may correspond to or be associated with any number of faces. The security seal 209 may display a new face based on an interaction by a user with the application. Further, the security seal 209 may display a new face based on the passage of a threshold period of time. The security seal 209 may cycle through any number of faces. For example, the security seal 209 may correspond to five faces and each face may be displayed based on a period of time or an interaction by the user (e.g., a click, a hover, or any other interaction by the user with the application and/or the security seal 209) In some cases, each face may be cycled through before the process (e.g., the cycle of faces) repeats.

For example, the security seal 209 may correspond to a first security seal face, a second security seal face, and a third security seal face. Each face may correspond to a specific feature associated with the security seal 209 and the security seal code 205. As described herein, in some cases, the seal code 205 can include computer-executable instructions to display each of the first security seal face, the second security seal face, and the third security seal face (as well as to determine which face to display and when to display each face). In certain cases, the seal code 205 may only include computer-executable instructions to display one face (e.g., the first security seal face), with instructions to check the security seal engine 222 for updates, which can result in the display of the second security seal face and/or the third security seal face (via receipt of additional computer-executable instructions).

Consider a scenario in which the first security seal face corresponds to an initial face of the security seal. Illustratively, the first security seal face may include a designation of a certificate authority, security seal system, etc. In some embodiments, the first security seal face may include additional or less information. For example, the first security seal face may include identity information, security information, a designation that the security seal is a security seal, a certificate associated with the security seal. Based on a changed environmental condition (e.g., an interaction with the first security seal face, a threshold period of time, a security update, a code update, etc.), the second security seal face may be displayed. The second security seal face may include additional identity verification information, security information, etc. The second security seal face may include more or less information than the first security seal face. Based upon a subsequent changed environmental condition (e.g., an interaction with the second security seal face, a threshold period of time, a security update, a code update, etc.), the third security seal face may be displayed. The third security seal face may include the image from the identity verification information. As noted above, the image may be vetted or verified by the identity information sources 260 and/or the identity information manager 224 such that the image has been determined to correspond to the entity associated with the application. The use of the image, verified or not, provides a further indication that the application or an associated entity can be trusted by the user. As the logo is associated with the entity, the user may recognize the logo, further providing an indication of the trustworthiness associated with the application. For example, for an application associated with Acme, the display of an Acme logo within the security seal 209 for the application indicates to a user of the application that the application can be trusted. In some embodiments, more or less faces of the security seal 209 may be used and the faces may be ordered in any manner. While security information 236, domain information 254, organization information 256, etc. displayed by the first security seal face may provide an indication of a level of trust that should be associated with the application, the use of a verified logo may indicate to a user who is not familiar with domain information 254 or organization information 256 that the application can be trusted. Therefore, the use of the verified logo enables an improved security seal that provides additional information about an application that is easier to parse by a user and therefore, improves computer communications.

Presentation of the Dynamic Security Seal

Figure 3A:
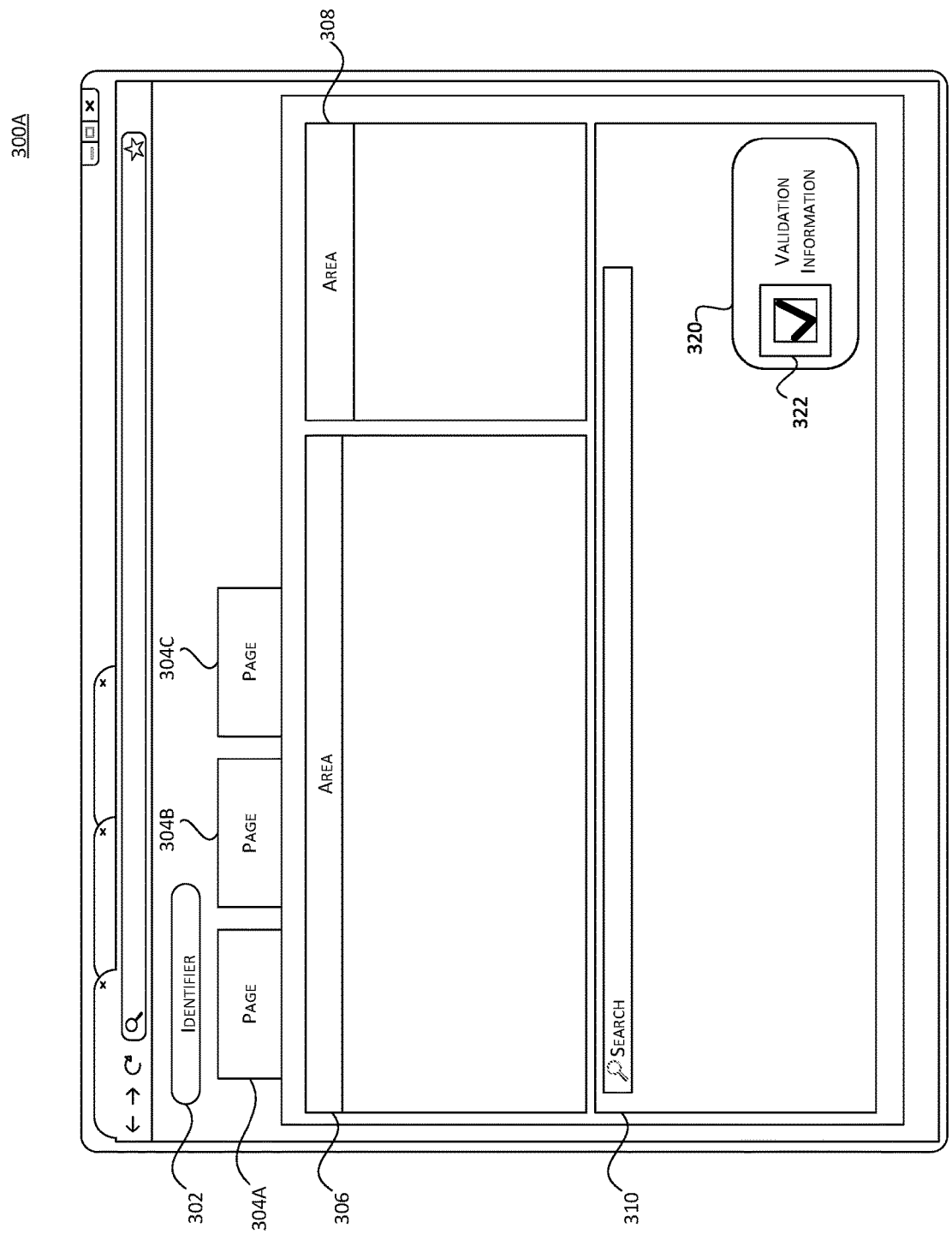
FIG. 3A depicts a schematic diagram of an example application and an example security seal according to some embodiments.

FIG. 3A depicts an example user interface 300A for presenting an application and a dynamic security seal 320 that offers an indication of a level of trust for communications received from the application. Although described herein with reference to a website, it will be understood that the concepts described herein can be used in conjunction with a variety of applications including gaming applications, mobile device applications, motion graphics, heads-up representations, computer applications, operating systems, etc. The example user interface may be the interface 206 providing the website and security seal 209 of FIG. 2. The example user interface 300A is illustrative of an interface that a server (e.g., the server 204) generates and presents to a user when interacting with the server. The server may receive information (e.g., code including the security seal code 205) from the security seal system 104 that the server can use to generate and present the interface to the user. In the example of FIG. 3A, the user interface 300A includes various components corresponding to the website and presented via the example user interface 300A. As will be described in more detail below, the components may include the security seal 320 that may provide multiple faces. It will be understood that FIG. 3A is illustrative only, and a server, via the user interface and based on information from the security seal system, may present any number of security seals or security seals that provide any type of validation information such as an image, identity information, certificate authority information, security information, etc.

The user interface 300A may include an identifier 302. The identifier 302 may identify a particular website and provide information about the particular website represented in the user interface 300A. The identifier 302 may correspond to any numerical, alphabetical, alphanumerical, or symbolical string.

The user interface 300A may further include a first page 304A, a second page 304B, and a third page 304C. By interacting with a control, a user can cause the user interface 300A to represent information about the first page 304A, the second page 304B, or the third page 304C. Further, the user interface 300A may include more, less, or different pages. Each of the first page 304A, the second page 304B, and the third page 304C can present the security seal 320. In some embodiments, one or more of the first page 304A, the second page 304B, or the third page 304C may present a different security seal. Further, one or more of the first page 304A, the second page 304B, or the third page 304C may present a different face of the security seal 320.

The page 304A of the user interface 300A may further include various areas including a first area 306, a second area 308, and a third area 310. The first area 306, the second area 308, and the third area 310 may include any information associated with the website and/or the entity associated with the entity. For example, the user interface 300A may correspond to an online shopping interface and the entity may correspond to an online retailer. Each of the first area 306, the second area 308, and the third area 310 may correspond to information such as items for purchase, information about the retailer, etc. The third area 310 of the user interface 300A may further include a search area. The search area includes a search bar that the user can use to query a system for certain information. For example, where the user interface 300A corresponds to online shopping interface, the search interface may allow the user to search for (and subsequently purchase) certain items. Each of the first area 306, the second area 308, and the third area 310 may allow the user to interact with the user interface 300A in a desired manner.

The user's interactions with the user interface 300A may be based on a level of trust that the user has with the website and/or the entity. For example, if the user does not have a high level of trust with any of the website or the entity, the user may be reluctant to interact with the user interface 300A. Further, the user may be reluctant to provide certain confidential information to the user interface 300A. Therefore, in order to provide an indication of a level of a trust that a user should have for the website and/or the entity, the user interface 300A may further include a security seal 320. The security seal 320 may indicate a level of trust that should be associated with the website and/or the entity. The security seal 320 may correspond to a validation by a vetting entity (e.g., a certificate authority, a security seal system, etc.) that the website and/or the entity can be trusted. As the security seal 320 is provided by a vetting entity, a user can confirm that the website and/or the entity should be trusted.

In order to provide information about the level of trust that the user should have for a particular website and/or entity, the security seal 320 may include validation information and/or a validation designation 322. The validation information may include one or more of security information, image information, domain information, organization information, or additional information. The security seal 320 may include to different appearances (e.g., faces) that each correspond to a particular subset of the validation information. For example, a first face of the security seal 320 may include domain information and organization information and a second face of the security seal 320 may include image information. The security seal 320 may cycle through the various associated faces based on corresponding security seal code. The validation designation 322 may include a designation of the validation status of the website and/or the entity. For example, the validation designation 322 may include a checkmark indicating that the entity has been validated, an x indicating that the entity has not been validation, or a question mark or an exclamation mark indicating a potential issue in the validation. Further, the validation designation 322 may correspond to a particular color, a particular size, a particular letter or phrase, a particular number, etc. indicating the validation of the website and/or the entity. For example, the validation designation 322 may include a number between one and ten indicating a sliding scale of validation where a one indicates no validation, a ten indicates complete validation, a five indicates partial validation, etc. It will be understood that in other embodiments, the validation designation 322 may include more, less, or different designations of the validation status. Therefore, the security seal 320 may indicate a level of trust that should be associated with a particular website and/or a particular entity.

Faces of the Dynamic Security Seal

Figure 3B:
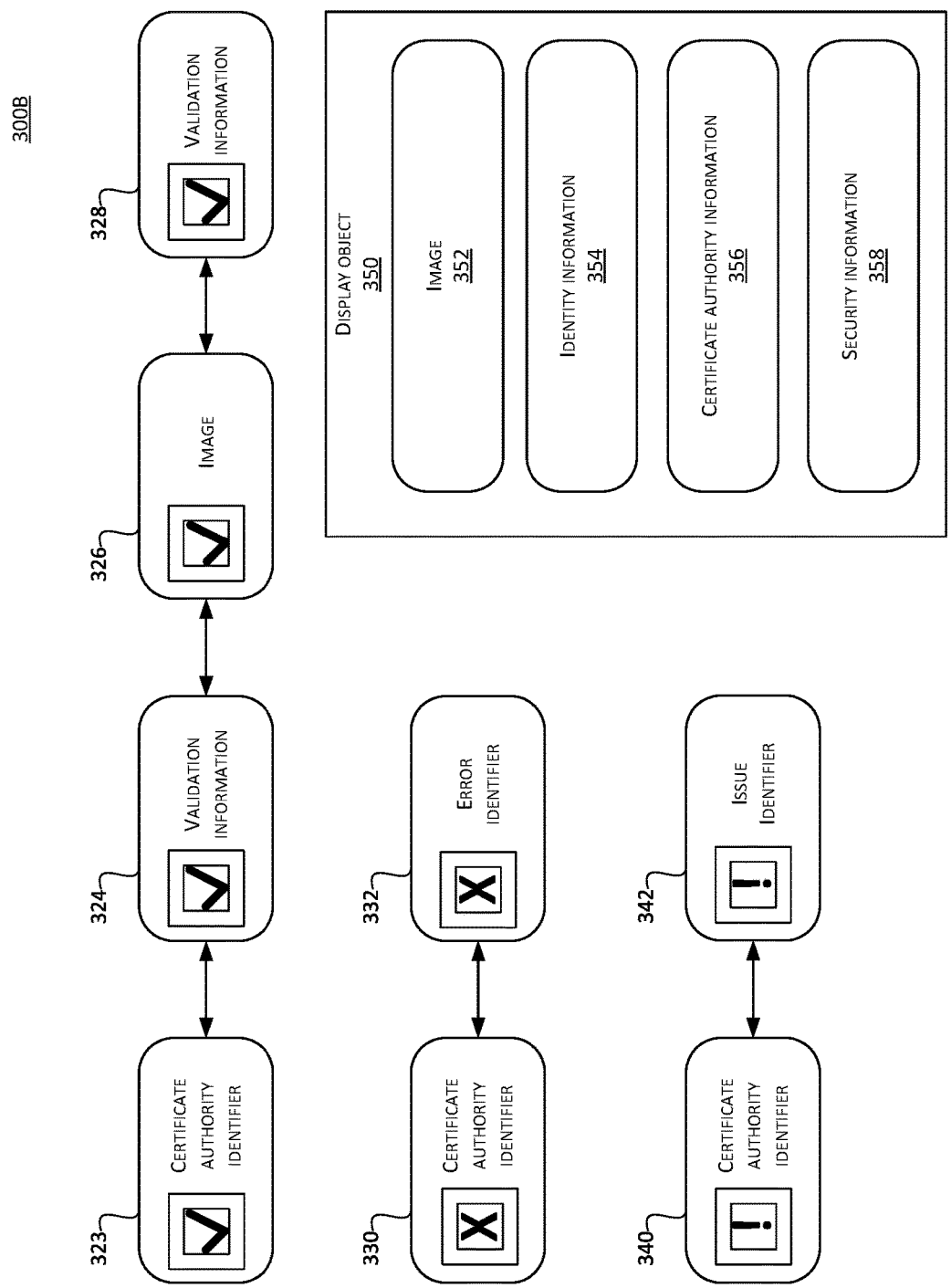
FIG. 3B depicts a schematic diagram of an example security seal according to some embodiments.

As noted above, the security seal can include numerous faces. Each face may provide additional or different information about the security or trustworthiness of a given application (e.g., a website) or entity. The use of the multiple faces further allows for a user to interact with the security seal to obtain additional information as needed. FIG. 3B is a block diagram illustrating an embodiment of various faces 323, 324, 326, 328, 330, 332, 340, and 342 of a security seal and a display object 350 of the security seal in a security seal issuance environment 300B.

The security seal may be a dynamic security seal that can provide multiple faces to a user of a website that is displaying the security seal. The face 323 displays an initial face of the security seal. The face 323 may include an indication of an entity (e.g., a certificate authority, a security seal system) that has verified the information associated with the website (e.g., the domain and organization information) and has deemed that it is trustworthy. In some embodiments, such as in FIG. 3A, the face of a security seal 323 may not include entity information. Further, the face 323 may include a checkmark or other indicator indicating that the website may be trusted. In some embodiments, the face 323 may indicate a level of trust for a given website. The face 323 may include a numerical representation, an alphabetical representation, an alphanumeric representation, a color, or any other indicator that indicates a level of trust for the website. For example, the color red may indicate that the website should not be trusted and the color green may indicate that the website should be trusted. Therefore, the face 323 may be an initial indication to the user of the website of a level of trust that should be exhibited for the website.

The face 324 is another example face of a security seal. The face 324 may be displayed for the security seal based on a changed environmental condition (e.g., an interaction with the security seal by a user of the website, timeout period, completed security check, updated code, etc.). The face 324 may provide additional validation information about the website and/or the entity. For example, the face 324 may include additional identity verification information or security information. In some embodiments, the face 324 may include information previously displayed on face 323. Therefore, the face 324 displays additional information to provide an indication of the trustworthiness of the website.

The face 326 is another example face of a security seal. As noted above, the face 326 may be displayed based on a user interaction, a timeout period, or other changed environmental condition. The face 326 may include an image (e.g., a logo) associated with the entity that has been validated by a vetting entity (e.g., the identity information manager 224) to correspond to the entity. The use of the logo may provide a further indication to a user of the website that the website can be trusted. Such a use of the logo enables a quicker and more streamlined process as the user is able to quickly determine whether a given website can be trusted as the user may be previously familiar with the logo. For example, the logo may include a trademark of the entity associated with the website. As the security seal is being provided by a third party (e.g., a certificate authority, a security seal system), the inclusion of the logo within the security provides an indication of a level of trust beyond security information and identity validation information such as domain verification information. Therefore, the face 326 provides the logo to the user of the website to indicate a level of trust for the website.

The face 328 is another example face of a security seal. Similar to the face 324, the face 328 may provide additional security information or identity validation information. The face 328 may provide additional information that was not previously displayed in face 323, 324, or 326. In some embodiments, more or less faces may be used and the faces may be ordered according to any parameters. For example, the face 326 with the image may be provided as an initial face. Therefore, the face 328 can provide additional information for the user via the security seal.

The faces 330 and 332 are additional example faces of a security seal. The face 330 may include an indication that an error has occurred or that an issue has been found with regards to the website and/or entity. For example, the identity verification information and/or security information may no longer be valid. The face 330, therefore, may indicate, that the website is associated with incorrect identity information (e.g., the domain information or organization information is incorrect), has exhibited poor security, or is otherwise untrustworthy. The face 330 may be brought up simultaneously or concurrently with a determination that the website can no longer be trustworthy. For example, the security seal engine 222 may analyze incoming validation, security, or identity information and based on the analysis, provide an updated security seal, updated security seal code 221, an indication regarding the security seal status, or other information relevant to a change in the security seal states, to the server providing the website. For example, when a visitor first lands on the website, the security seal may indicate that the website can be trusted. As the visitor remains on the website, the security seal may be modified (based on the security seal code 221 or an update to the security seal code 221) to indicate that the website cannot be trusted. In some embodiments, the display of the security seal may be updated periodically (e.g., every ten seconds, every minute, hourly, daily, weekly, etc.). In some embodiments, the security seal may be updated based on particular website or a particular entity. For example, a first security seal for a first website may update based on the receipt of new information, the second security seal for a second website may update weekly, and a third security seal for a third website may update every three minutes. Further, a first website for an entity may update according to first parameters and a second website for the same entity may update according to second parameters. For example, the first website may update weekly and the second website may update based on receiving an updated security seal. The updating parameters may be provided by the entity and/or the security seal engine 222. The face 330 may further be a dynamic face and based on changing environmental conditions, the face 330 may provide additional information. The face 332 may include the additional information (e.g., an error identifier). The additional information may further provide an additional notification or explanation for why the website is untrustworthy. For example, the additional information may include the updated security information and/or the updated identity verification information. Therefore, the faces 330 and 332 may be used to indicate issues with regards to the security seal.

The faces 340 and 342 are additional example faces of a security seal. The face 340 indicates a potential issue with regards to the trustworthiness of the website. Where face 330 indicated an issue with regards to the trustworthiness of a particular site, face 340 indicates a potential issue. For example, face 340 may indicate that the security seal engine 222 has determined that a potential issue may exist such as a pending expiration of an associated certificate, a minor error within the organization or domain information, etc. The face 340 may further be a dynamic face such that based on a user interaction with the face 340, a timeout period, or other changed environmental condition, the face 340 may provide additional information about the potential issue (e.g., a cause of the potential issue). The face 342 may include the additional information (e.g., an issue identifier). Therefore, the faces 340 and 342 may be used to indicate potential issues with regards to the security seal.

Further, in the event that an issue or a potential issue has been detected with regards to the security seal (e.g., a determination that the website may be untrustworthy), the security seal may be further modified. The security seal may be modified based on the issue. For example, the security seal may be enlarged, bolded, brightened, the color may be modified, or any other changes to the security seal. Further, the severity of the security seal may be reflected in the change to the security seal. For example, in the event of the detection of a minor issue or a potential issue, the security seal may change colors (e.g., blue to yellow) or change sizes (e.g., small to medium) and in the event of the detection of a major issue (e.g., a determination that the website is not trustworthy), the security seal may change colors (e.g., blue to red), change sizes (e.g., small to large), become flashing, or otherwise indicate that an issue has been encountered with regards to the security seal. Further, in the event, that no issues are detected with regards to the security seal (e.g., a website is trustworthy), the security seal may be modified (e.g., the size of the security may be decreased, the security seal may be dimmed, the security seal may be made less bright, or the security seal may otherwise be modified).

In certain cases, based on a user interaction with the security seal, additional information unrelated to the security seal or security of the website can be displayed. Such information may be displayed as part of the security seal or as a separate window or other display object. Display object 350 is an example of a separate window that can display additional information related to the security seal. The display object 350 may display additional information such as more identity validation information or security information. In the example of FIG. 3B, the display object 350 includes an image 352 (e.g., a logo), identity information 354, certificate information 356, and security information 358. It will be understood that the display object 350 may include more, less, or different information.

Issuing a Security Seal Including an Image

FIG. 4 is a data flow diagram depicting an example data flow between various components in the security seal issuance environment 100 to provide a dynamic security seal to a client computing device 102. With reference to FIG. 4, illustrative interactions will be described for causing a dynamic security seal to be displayed to a user, in accordance with embodiments of the present disclosure.

At (1), the administration system 110 requests a dynamic security seal for an application from the security seal system 104. As described herein, the application can be associated with or controlled by an entity. For example, if the application is a website, the entity can be the company that controls the website and/or its content.

To determine if the dynamic security seal should be granted, the security seal system 104, (2) validates a relationship between the application and the entity that controls or is associated with the application. In the illustrated embodiment, the validation process includes communicating with one or more third party systems 108. For example, the security seal system 104 can verify that the information about the entity (e.g., legal name or contact information) provided from the administration system 110 matches information about the entity from a third party system 110 (e.g., government website). Although not illustrated, in some cases, the validation process can include communicating with the administration system 110. For example, if the application is a website, the security seal system 104 may send a request to the administration system to manipulate the website in some way or to include certain code or computer-executable instructions in the website.

At (3), the security seal system 104 identifies an image. In certain cases, the image is identified from the information received from the administration system 110 as part of the request for the dynamic security seal.

At (4), the security seal system 104 validates a relationship between the image and the entity. For example, the security seal system 104 may attempt to validate that the identified image is a trademark, logo, word mark, or other mark or image that is associated with the entity that controls the application. In the illustrated example, the security seal system 104 validates the relationship between the image and the entity using information received from a third party system 108 (the same or different third party system referenced at (2)). For example, if the third party system 108 is a trademark database, the security seal system 104 can confirm that the entity identified by the administration system 110 as requesting the dynamic security seal is identified in the trademark database as the owner or otherwise being associated with the identified image.

Based on the validation of the relationship between the application and the entity and the validation of the relationship between the image and the entity, the security seal system 104, at (5), generates the dynamic security seal, and, at (6), communicates the dynamic security seal to the administration system 110. As described herein, the dynamic security site seal can include computer-executable instructions that cause the display of the seal on a display.

At (7), the administration system 110 associates the dynamic security seal with the application. For example, the administration system 110 can embed computer-executable instructions of the dynamic security seal into the computer-executable instructions of the application or link the computer-executable instructions of the dynamic security seal with the computer-executable instructions of the application (e.g., include it as a library or a DLL).

At (8), the client computing device 102 requests the application from the administration system 110 and, at (9), the administration system 110 communicates the application to the client computing device 102. Based on the association of the dynamic security seal with the application, when the computer-executable instructions of the application are executed on the client computing device 102, the computer-executable instructions of the dynamic security seal can also be executed. As the computer-executable instructions of the dynamic security seal are executed, the dynamic security seal can be displayed on a display associated with the client computing device 102. Further, the dynamic security seal can be displayed in association with the application. For example, if the application is a website, the dynamic security seal can be displayed on the website. If the application is a computer program, the dynamic security seal can be displayed on a splash screen when the computer program is initiated or throughout the use of the computer program. If the application is an operating system, the dynamic security seal can be displayed on a splash screen when the underlying device (e.g., a laptop, desktop, smartphone, or other personal computing device, medical device, internet-of-things device, etc.) is turned on or throughout the use of the underlying device.

The various interactions described with reference to FIG. 4 can be done in any order and/or some may be omitted. For example, in some cases any one or any combination of (2), (3), (4) and/or (5) can be done prior to (1). In certain cases, (8) and/or (9) may be omitted. For example, in some cases, the application may be an operating system pre-installed on a client computing device 102 or medical device. In some such cases, when the computer-executable instructions of the applications are executed, the computer-executable instructions of the dynamic security seal can also be executed. In certain cases, the application may be executed on a device remote from the client computing device (e.g., in one or more containers, virtual machines, or other isolated computing environment within a hosted or cloud environment, where computing resources of a particular computing device are shared by multiple isolated execution environments). In instances where the application is not executed on the client computing device 102, the computing device that executes the computer-executable instructions of the application can also execute the computer-executable instructions of the dynamic security seal and display the dynamic security seal to the client computing device 102.

Figure 5:
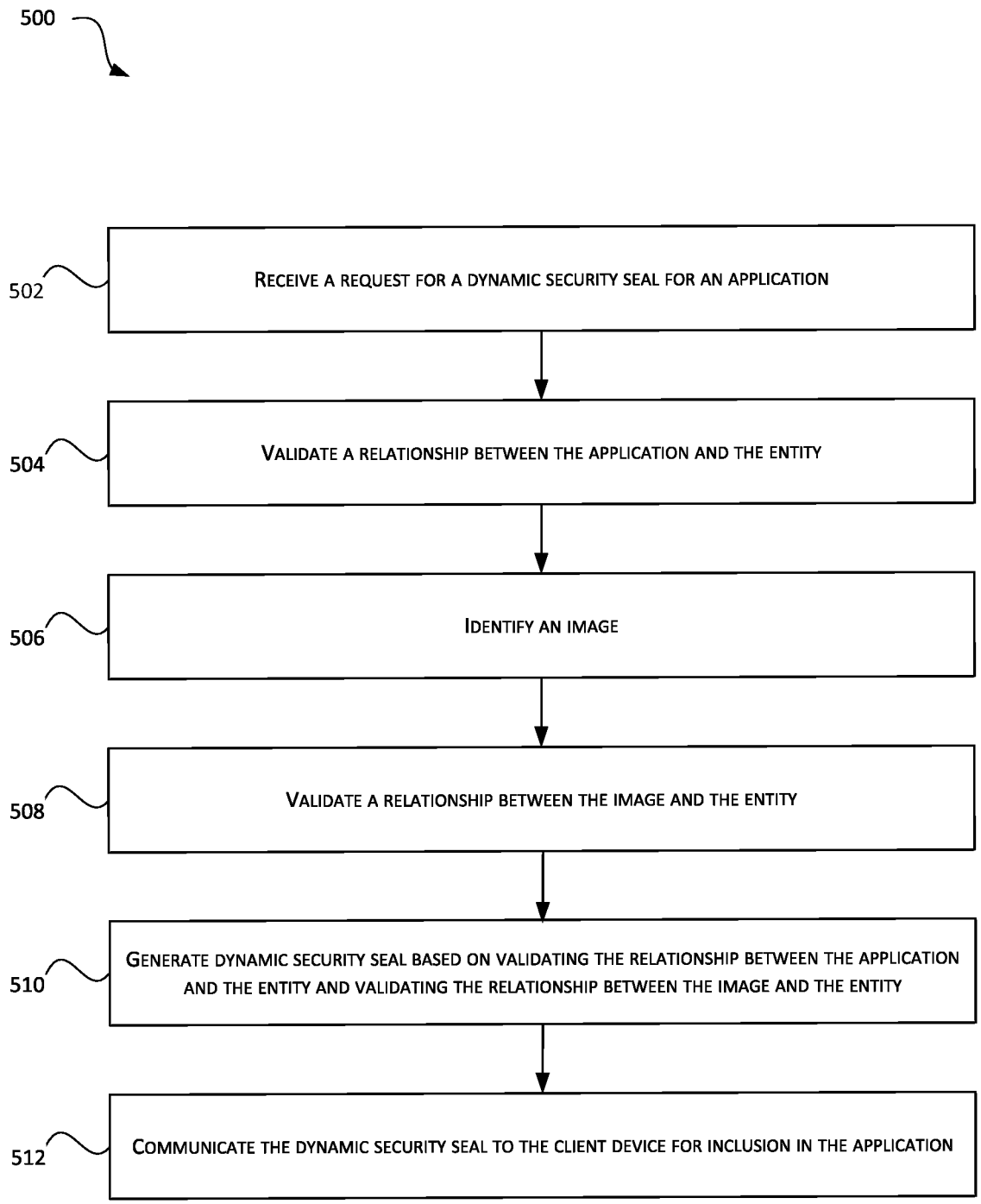
FIGS. 5, 6 and 7 are flowcharts of an example routine for causing display of an image via a security seal.

FIG. 5 is a flow diagram illustrating an embodiment of a routine 500 implemented by a security seal system 104 issue a security seal that includes an image associated with an entity associated with the application. Although described herein as being implemented by the security seal system 104, it will be understood that any one or any combination of the steps described herein can be implemented by one or more components associated with the security seal system 104, such as, but not limited to, the security information manager 234, remote security information intermediate 230, security scanner 232, security seal code generator 220, security seal engine 222, and/or the identity validation system 106.

At block 502, the security seal system 104 receives a request for dynamic security seal for an application. In certain cases, the request may be received from the administration system 110 and may identify an entity that desires to have its relationship with the application validated. In certain cases, the request can also include an image to be validated with the entity.

At block 504, the security seal system 104 validates a relationship between the application and the entity. The validation of the relationship between the application and the entity may be based on information received from a third party system 110, information determined by the security seal system 104, and/or actions by the administration system 110. In some cases, the validation of the relationship between the application and the entity may indicate that the application is associated with the entity.

In certain cases, the security seal system 104 validates the relationship between the application and the entity by requiring the administration system 110 or the entity to manipulate the application in a demonstrable way. For example, if the application is a website, the security seal system 104 may request the administration system to add code, an image to the website, or otherwise demonstrate control of the website. If the application is a computer application or operating system, the security seal system 104 may request the administration system 110 to provide a digital certificate signed by a certificate authority indicating the relationship between the application and the entity.

In some cases, the security seal system 104 communicates with a third party system 108 to validate the relationship between the entity and the application. For example, the third party system 108 may be a government website that include legal information about the entity. The security seal system 104 can compare the information about the entity received from the administration system 110 with the information obtained from the third party system 108.

In some cases, the security seal system 104 may validate a relationship between code corresponding to the application and the entity. In some embodiments, the security seal system 104 may parse the code corresponding to the application for an identifier of the entity. For example, where the entity is Acme, the security seal system 104 may parse the code corresponding to the application for the term "Acme" or any other identifier associated with the term "Acme." Further, the code may not include the term "Acme" and may contain an identifier such as "12345678," that the security seal system 104 is trained to associate with the entity Acme. Based on parsing the code, the security seal system 104 may validate a relationship between the application and the entity.

At block 506, the security seal system 104 can identify an image. In certain cases, the identification of the image may occur subsequent to causing the display of the security seal. In some cases, the identification of the image may occur prior to causing display of the security seal. The security seal system 104 may identify the image based on information provided by the administration system 110 or an entity that desires its relationship with the image to be validated or desires the image to be displayed with the application. For example, the entity may indicate that the image is associated with the entity. In some embodiments, the image may be stored by the security seal system 104 and it may be stored in relation to a given entity. Therefore, the security seal system 104 may identify an image associated with a given entity.

At block 508, the security seal system 104 may validate a relationship between the image and the entity. The validation of the relationship between the image and the entity may be based on an image record from a third party system 108. For example, the security seal system 104 may query a database to determine if the image (or mark) is associated with the entity. The database may be a validated database such as a local trademark database, a national trademark database, or another database linking images or marks to entities. The security seal system 104 may use the database to confirm that the image is associated with the particular organization, domain, or other information associated with the particular entity. The security seal system 104 may perform additional verifications or validations to confirm that the image is associated with the entity. For example, if the image includes words, the security seal system 104 may confirm that the words are associated with the entity (e.g., where the image includes the word "Acme", the security seal system 104 may confirm that the word "Acme" is associated with the particular entity). In some embodiments, the validation of the relationship between the image and the entity may occur prior to the display of the dynamic security seal. In certain cases, the validation of the relationship between the image and the entity may be in response to receiving an image from the entity that desires to be associated with the application (or from the administration system 110) or otherwise determining an image for the given entity.

In some embodiments, the security seal system 104 may not verify a relationship between the image and the entity. Instead, the security seal system 104 may identify an image based on information provided by the entity to establish an image for the entity.

At block 510, the security seal system 104 generates the dynamic security seal. In some cases, the security seal system 104 generates the dynamic security seal based on or in response to validating the relationship between the application and the entity and validating the relationship between the image and the entity. The dynamic security seal instructions may include information associated with the application, the entity, and/or the image. Further, the dynamic security seal may identify the validation of the relationship between the application and the entity and/or the validation of the relationship between the image and the entity. In certain cases, the dynamic security seal includes computer-executable instructions that when executed by a computing device causes the computing device to display the dynamic security seal. In some cases, the computer-executable instructions of the dynamic security seal can also cause additional validations to be performed (e.g., continue to validate the application over time), communicate with the security seal system 104 to determine what face or information should be displayed (e.g., whether to display the validated image, error or warning information, etc.), etc.

At block 512, the security seal system 104 communicates the dynamic security seal (including its computer-executable instructions) to the requesting device for associated with the application. As described herein, the requesting device can associate the dynamic security seal with the application such that when the application is executed, the dynamic security seal is displayed.

Fewer, more, or different steps can be included in the routine 500 as desired. For example, in response to the validation of the relationship between the image and the entity, the security seal system 104 may issue a security seal to the entity. As another example, if the security seal system 104 determines that a relationship between the image and the entity does not exist, the relationship between the image and the entity is invalid, the relationship between the image and the entity has been terminated, or the relationship between the image and the entity lacks certain permissions, the security seal system 104 can terminate the display of the logo. Similarly, if the image does not match or is not sufficiently similar to the authenticated image for the entity, then the security seal system 104 indicate via the security seal that an improper image is associated with the entity. Furthermore, the steps may performed in a different or order or concurrently. In some cases, blocks 504 and/or 508 may occur concurrently and/or prior to block 502. In some such cases, the routine may omit block 504-508 such that upon receiving the request, the security seal system 104 generates the dynamic security seal and communicates it to the requesting device.

In certain cases, if, during display of the dynamic security seal, the security seal system 104 determines (or the dynamic security seal determines) that the associated application is no longer trustworthy or identifies an error or warning associated with the application, the dynamic security seal can display additional information (e.g., on a different face) regarding the error, security lapse, or warning. In certain cases, the dynamic security seal can display multiple faces depending on interactions with the user, time, etc. In some cases, the different faces of the dynamic security seal are the same size or roughly the same size (e.g., +/−10% or 20% of the same size), but display different information. For example, the dynamic security seal can alternately display (e.g., every ten seconds) an indication that the application is trusted (e.g., a checkmark), the validated image (e.g., logo associated with the entity), and/or other information (e.g., expiration date of the dynamic security seal, validation dates, etc.).

Although described herein with reference to displaying an authenticated image via a security seal, it will be understood that the concepts described herein can be used in conjunction with a variety of technologies used to display a validated image, such a verified mark certificate for email messaging.

Figure 6:
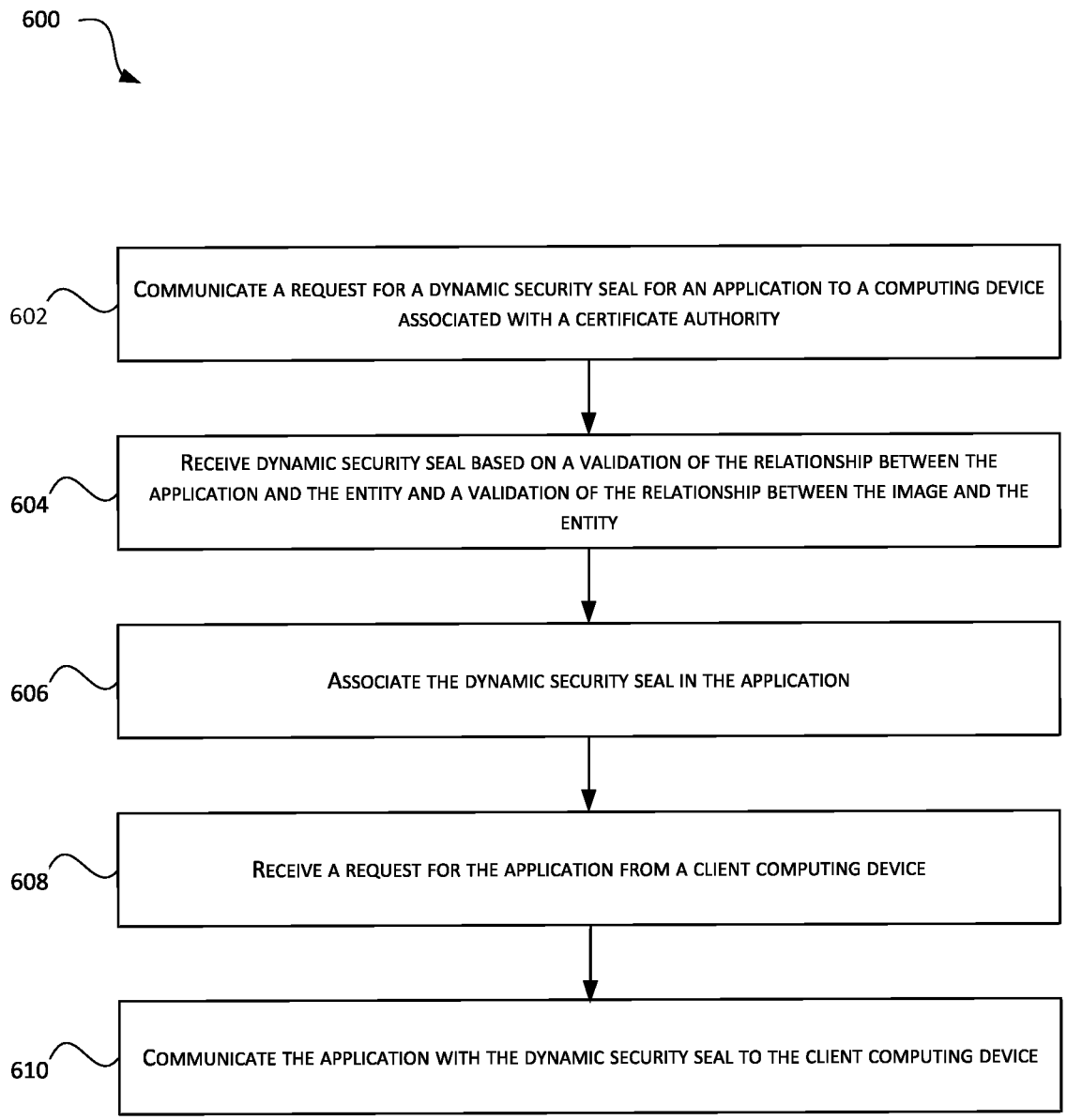

FIG. 6 is a flow diagram illustrating an embodiment of a routine 600 implemented by an administration system 110 to issue an application that includes a dynamic security seal that includes an image associated with an entity associated with the application.

At block 602, the administration system 110 communicates a request for a dynamic security seal for an application to the security seal system 104. In some cases, the security seal system 104 may be a certificate authority. In certain cases, the administration system 110 may not request the dynamic security seal. For example, the security seal system 104 may generate the dynamic security seal based on a predetermined policy. In some cases, the request can identify an entity that desires its relationship with the application and/or an image to be validated.

At block 604, the administration system 110 receives the dynamic security seal based on a validation of the relationship between the application and the entity and a validation of the relationship between the image and the entity. As described herein, the administration system 110 may receive the dynamic security seal from the security seal system 104.

At block 606, the administration system 110 associates the dynamic security-seal with the application. As described herein, this can include embedding computer-executable instructions of the dynamic security seal into computer-executable instructions of the application. As described herein, the computer-executable instructions of the dynamic security seal, when executed, can implement the dynamic security seal, including dynamically displaying different faces of the dynamic security seal, communicating with the security seal system 104, causing validations of the application to be performed, etc.

At block 608, the administration system 110 receives a request for the application from a client computing device 102. The administration system 110 may receive the request for the application as an HTTP GET request or other internet protocol. In other embodiments, the request for the application may further be any other type of request.

At block 610, the administration system 110 communicates the application with the dynamic security seal to the client computing device 102. In some cases, the application can be in the form of computer executable code and the administration system 110 can communicate the computer executable code to the client computing device 102 for execution. For example, if the application is a website, the administration system 110 can communicate the code of the website to the client computing device for execution. When computer-executable instructions of the application are executed at the client computing device, the computer-executable instructions of the dynamic security seal can also be executed. When executed, the computer-executable instructions of the dynamic security seal can cause the client computing device to display the one or more faces of the dynamic security seal, communicate with the security seal system 104 to receive updates regarding the trustworthiness of the application, and/or initiate validations of the application.

Although described herein with reference to displaying an authenticated image via a security seal, it will be understood that the concepts described herein can be used in conjunction with a variety of technologies used to display a validated image, such as a verified mark certificate for email messaging.

Figure 7:
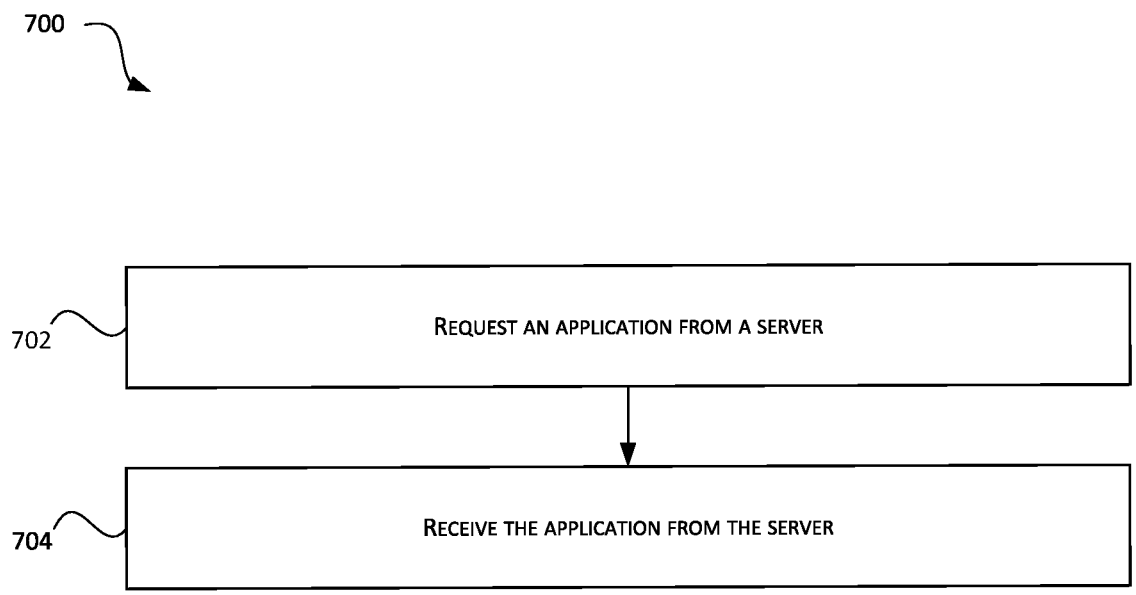

FIG. 7 is a flow diagram illustrating an embodiment of a routine 700 implemented by a client computing device 102 to request an application that includes a dynamic security seal.

At block 702, the client computing device 102 requests an application from the administration system 110. The application is associated with an entity that administers/controls the application and be associated with a dynamic security seal. In some cases, the client computing device 102 is unaware that the application is associated with the dynamic security seal. In certain cases, the client computing device 102 may request that the application include the dynamic security seal. In some cases, the client computing device 102 may request the application by opening a channel (e.g., a TCP channel) to the administration system 110. Further, the client computing device 102 may open the channel based on a uniform resource identifier (e.g., a uniform resource locator). In certain case, the client computing device 102 may request to download and/or install the application.

At block 704, the client computing device 102 receives the application from the administration system 110. As described herein, the application may be associated with the dynamic security seal. In certain cases, computer-executable instruction that implements the dynamic security seal is embedded within, linked to, or otherwise associated with, the computer-executable instructions of the application. For example, the application may be computer executable code that can be executed by the client computing device 102 that includes or is linked to the computer-executable instructions of the dynamic security seal.

The execution of the computer-executable instructions of the dynamic security seal can cause the display of multiple faces of the dynamic security seal. In certain cases the faces are displayed sequentially based on time and/or based on a user's interaction with the dynamic security seal. At least one of the plurality of faces can include an image having a validated relationship with the entity that administers/controls the application. Further, the execution of the dynamic security seal computer-executable instruction can cause the display of the image in place of other information, such as an indication that the application is validated (e.g., a checkmark), information about the entity associated with the application, information about the security seal information or entity that validated the relationship between the application and the entity, etc. The display of the image as part of the dynamic security seal may be based at least in part on completion of the one or more additional validations (e.g., validation of the relationship between the entity and the application and between the entity and the image). Further, the display of the image may be based at least in part on a user interaction with the application, a timeout period, or any other determination. The display of the image on the application may occur after the display of other information of the dynamic security seal. In some embodiments, the display of the image may occur simultaneously with other information of the dynamic security seal. In certain embodiments, the display of the image may be responsive to identification of an image associated with the entity and/or validation of a relationship between the image and the entity based on an image record.

The execution of the computer-executable instructions of the dynamic security seal can further cause performance of one or more additional validations on information associated with the application, the entity, and/or the third party system 108. For example, the execution of the computer-executable instructions of the dynamic security seal can further cause the one or more validations on security information and/or additional identity information (e.g., domain information, organization information, etc.) received locally or from the third party system 108. The one or more additional validations may occur after the display of the dynamic security seal and may be used to update the dynamic security seal. For example, where the additional validations indicate that an application should no longer be trusted, the display of the dynamic security seal may be updated to indicate the updated level of trust.

In some such cases, the display of the dynamic security seal may be updated by changing the face of the dynamic security seal from a face that includes an indication that the application is trusted to a face that includes an indication that the application is not trusted. The updated display may be based at least in part on determining that one or more of the relationship between the entity and the application or the relationship between the entity and the image is invalid. In certain cases, the display of the dynamic security seal can be updated by receiving additional computer-executable instructions for the dynamic security seal from the security seal system 104 and/or the administration system 110. The new computer-executable instructions can cause the display of the dynamic security seal to indicate that the application is not trusted. The additional computer-executable instructions may replace and/or may be aggregated to the previously received computer-executable instructions of the dynamic security seal. In some cases, the display of the dynamic security seal can be updated by receiving additional information to be displayed, such as information indicating that the application is not trusted. The additional information may be displayed as a face of the dynamic security seal. In certain cases, while the application is determined to not be safe, the dynamic security seal can continuously display the face indicating that the application is not trusted. In some cases, the face that indicates that the application is not trusted can be displayed sequentially or in a manner similar to other faces of the dynamic security seal.

In some embodiments, the one or more additional validations may occur prior to the display of the security seal. Further, the periodic execution of the computer-executable instructions of the dynamic security seal or updated computer-executable instructions of the dynamic security seal can cause periodic (e.g., hourly, daily, weekly, etc.) additional validations or validations based on the receipt of updated information (e.g., updated security information). The one or more additional validations may include validating organization information of an organization associated with the entity, validating recency of vulnerability scanning, validating level of site payment card industry ("PCI") compliance, validating transport layer security ("TLS") checks, validating use of certificate transparency ("CT") logs for security checks, validating implementation of a web application firewall ("WAF"), or any other validation based on the security information and/or the identity information.

Although described herein with reference to displaying an authenticated image associated with an application via a dynamic security seal, it will be understood that the concepts described herein can be used in conjunction with a variety of technologies used to display a validated image, such as a verified mark certificate for email messaging. For example, the validated image (or dynamic security seal) can be displayed as part of an email message or as part of header information or a preview "snippet" of an email message.

Example Computing System

Figure 8:
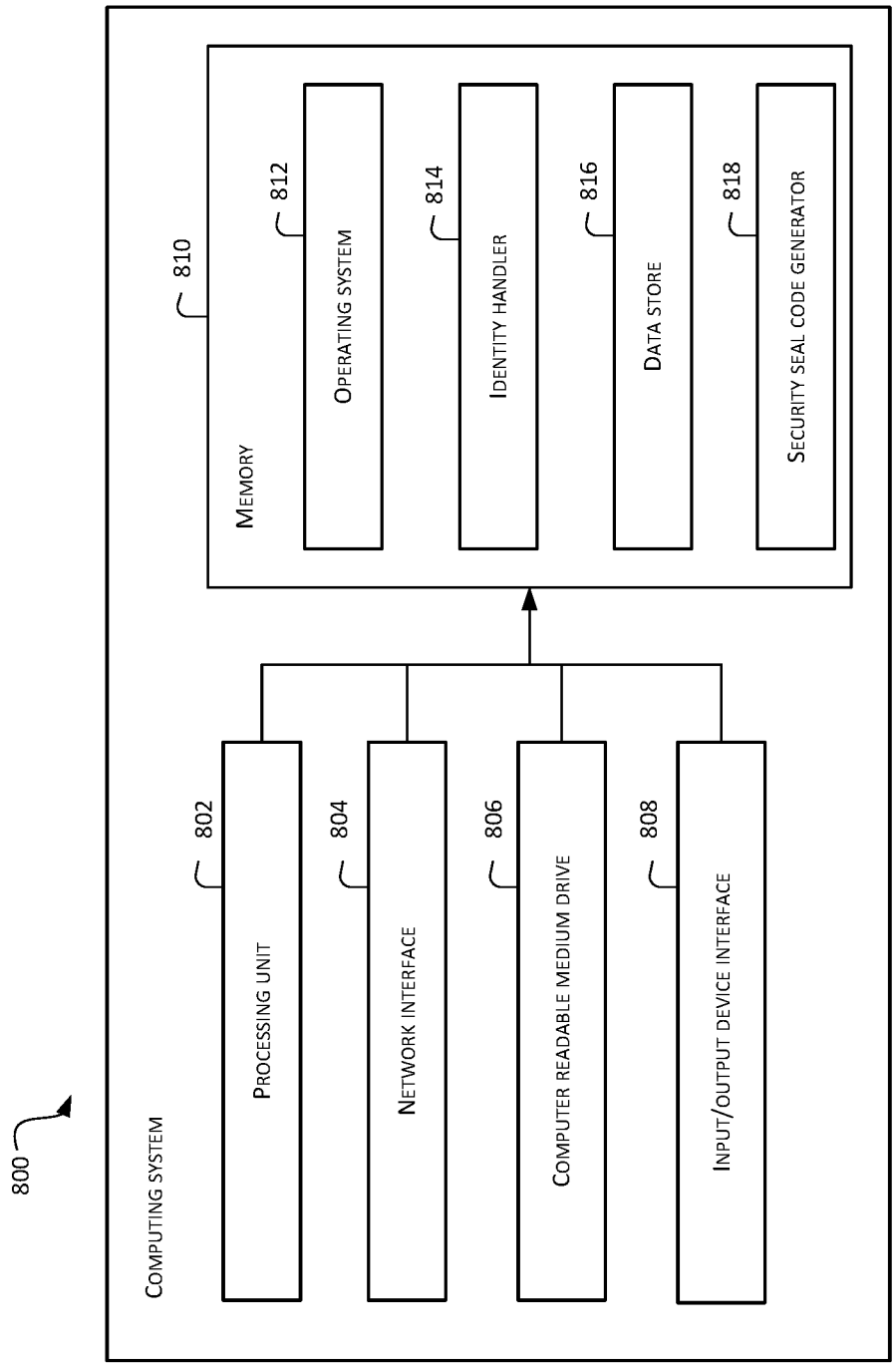
FIG. 8 shows an example computing device that may be used to implement aspects of the present disclosure.

FIG. 8 illustrates an example computing system 800 configured to execute the processes and implement the features described above. In some embodiments, the computing system 800 may include: one or more computer processors 802, such as physical central processing units ("CPUs"); one or more network interfaces 804, such as a network interface cards ("NICs"); one or more computer readable medium drives 806, such as a high density disk ("HDDs"), solid state drives ("SDDs"), flash drives, and/or other persistent non-transitory computer-readable media; an input/output device interface 808, such as an input/output ("IO") interface in communication with one or more microphones; and one or more computer readable memories 810, such as random access memory ("RAM") and/or other volatile non-transitory computer-readable media.

The network interface 804 can provide connectivity to one or more networks or computing systems. The computer processor 802 can receive information and instructions from other computing systems or services via the network interface 804. The network interface 804 can also store data directly to the computer-readable memory 810. The computer processor 802 can communicate to and from the computer-readable memory 810, execute instructions and process data in the computer readable memory 810, etc.

The computer readable memory 810 may include computer program instructions that the computer processor 802 executes in order to implement one or more embodiments. The computer readable memory 810 can store an operating system 812 that provides computer program instructions for use by the computer processor 802 in the general administration and operation of the computing system 800. The computer readable memory 810 can further include computer program instructions and other information for implementing aspects of the present disclosure. For example, in one embodiment, the computer readable memory 810 may include an identity information manager 814. As another example, the computer-readable memory 810 may include a data store 816. Further, the computer readable memory 810 may include a security seal code generator 818. In some embodiments, multiple computing systems 800 may communicate with each other via their respective network interfaces 804, and can implement multiple sessions each session with a corresponding connection parameter (e.g., each computing system 800 may execute one or more separate instances of the processes 400), in parallel (e.g., each computing system 800 may execute a portion of a single instance of a process 400), etc.

Terminology

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, personal digital assistants ("PDAs"), and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method for displaying a dynamic security seal, the method comprising:
   receiving a request for a dynamic security seal for an application from a client device associated with an entity;
   validating a relationship between the application and the entity by any of parsing code, requiring manipulation of the application, and utilizing third party systems;
   identifying an image;
   validating a relationship between the image and the entity;
   upon determining the relationship between the image and the entity is valid, generating dynamic security seal computer-executable instructions for the dynamic security seal based on the validating the relationship between the application and the entity, wherein the dynamic security seal computer-executable instructions include instructions for displaying a plurality of faces of the dynamic security seal and when to display the plurality of faces; and
   communicating the dynamic security seal computer-executable instructions to the client device for inclusion in computer-executable instructions of the application, wherein the dynamic security seal computer-executable instructions are embedded in the computer-executable instructions of the application such that when the application is executed, the dynamic security seal is displayed,
   wherein when the computer-executable instructions of the application is executed, the dynamic security seal computer-executable instructions are executed, wherein execution of the dynamic security seal computer-executable instructions causes:
      sequential display of the plurality of faces of the dynamic security seal, wherein at least one of the plurality of faces includes the image;

upon determining the relationship between the image and the entity is invalid, generating additional dynamic security seal computer-executable instructions based at least in part on determining the relationship between the image and the entity is invalid; and communicating the additional dynamic security seal computer-executable instructions to the client device for inclusion in the computer-executable instructions of the application, wherein the additional dynamic security seal computer-executable instructions are embedded in the computer-executable instructions of the application, wherein, when the computer-executable instructions of the application is executed, the additional dynamic security seal computer-executable instructions are executed, wherein execution of the additional dynamic security seal computer-executable instructions causes:

termination of the sequential display of the plurality of faces of the dynamic security seal, and display of a second image in place of the dynamic security seal via the application.

2. The computer-implemented method of claim 1, wherein the application comprises at least one of a website, a computer application, a mobile application, an augmented reality application, a virtual reality application, a medical device application, a motion graphics application, a heads-up representations, or a gaming application.

3. The computer-implemented method of claim 1, wherein the image comprises at least one of a video, a word mark, one or more words, one or more letters, a motion representation, an animation, a sound, a holographic image, or a graphical representation.

4. The computer-implemented method of claim 1, wherein validating the relationship between the application and the entity comprises requiring the entity to manipulate the application in a desired way, thereby validating a relationship between code corresponding to the application and the entity.

5. The computer-implemented method of claim 1, wherein execution of the dynamic security seal computer-executable instructions further causes performance of one or more additional validations on information associated with the application in real-time.

6. The computer-implemented method of claim 1, wherein execution of the dynamic security seal computer-executable instructions further causes performance of one or more additional validations on information associated with the application, wherein performance of the one or more additional validations on information associated with the application comprises obtaining pre-validated information.

7. The computer-implemented method of claim 1, wherein validating the relationship between the application and the entity comprises validating a relationship between the computer-executable instructions of the application and the entity.

8. The computer-implemented method of claim 1, wherein the execution of the dynamic security seal computer instructions further causes display of the image via the dynamic security seal based at least in part on at least one of an interaction of a user of the application with the dynamic security seal or a threshold period of time.

9. The computer-implemented method of claim 1, wherein execution of the dynamic security seal computer-executable instructions further causes performance of one or more additional validations on information associated with the application, wherein the one or more additional validations comprise at least one of validating organization information of an organization associated with the entity, validating recency of vulnerability scanning, validating level of site payment card industry compliance, validating transport layer security checks, validating use of certificate transparency logs for security checks, or validating implementation of a web application firewall and wherein the method further comprises:

causing a modification of the security seal based on the one or more additional validations, wherein the modification includes any of making the security seal larger, bolder, brighter, and changing the color of the security seal.

10. The computer-implemented method of claim 1, wherein validating the relationship between the image and the entity occurs prior to receiving a request, from an organization associated with the application, to cause display of the dynamic security seal via the application.

11. The computer-implemented method of claim 1, wherein validating the relationship between the image and the entity is based at least in part on an image record, wherein the image record indicates a relationship between the image and the entity based at least in part on a trademark database.

12. The computer-implemented method of claim 1, wherein validating the relationship between the image and the entity is based at least in part on an image record, the computer-implemented method further comprising:

updating the image record to update the relationship between the image and the entity;

generating additional dynamic security seal computer-executable instructions; and communicating the additional dynamic security seal computer-executable instructions to the client device for inclusion in the application, wherein the additional dynamic security seal computer-executable instructions are embedded in the application, wherein, when the application is displayed, the additional dynamic security seal computer-executable instructions are executed, wherein execution of the additional dynamic security seal computer-executable instructions causes:

an update to the sequential display of the plurality of faces of the dynamic security seal.

13. The computer-implemented method of claim 1, wherein validating the relationship between the image and the entity is based at least in part on an image record, wherein the image record comprises a verified mark certificate.

14. A computer-implemented method for displaying a dynamic security seal, the method comprising:

communicating a request for a dynamic security seal for an application to a computing device associated with a certificate authority, wherein the request includes entity information of an entity associated with the application, wherein the computing device validates a relationship between the application and the entity and a relationship between an image and the entity;

upon determining the relationship between the image and the entity is valid, receiving dynamic security seal computer-executable instructions for the dynamic security seal based on a validation of the relationship between the application and the entity, wherein the dynamic security seal computer-executable instructions include instructions for displaying a plurality of faces of the dynamic security seal and when to display the plurality of faces; and embedding the dynamic security seal computer-executable instructions in computer-executable instructions of the application;

receiving a request for the computer-executable instructions of the application from a client computing device; and communicating the computer-executable instructions of the application with the dynamic security seal computer-executable instructions embedded therein to the client computing device such that when the application is executed, the dynamic security seal is displayed, wherein execution of the dynamic security seal computer-executable instructions causes:

sequential display of the plurality of faces of the dynamic security seal based on any of an interaction of a user with the dynamic security seal and a timer, wherein at least one of the plurality of faces includes the image, upon determining the relationship between the image and the entity is invalid, receiving additional dynamic security seal computer-executable instructions;

embedding the additional dynamic security seal computer-executable instructions in the computer-executable instructions of the application;

communicating the computer-executable instructions of the application with the additional dynamic security seal computer-executable instructions embedded therein to the client computing device, wherein execution of the additional dynamic security seal computer-executable instructions causes:

termination of the sequential display of the plurality of faces of the dynamic security seal, and display of a second image in place of the dynamic security seal on the application.

15. The computer-implemented method of claim 14, wherein the execution of the dynamic security seal computer instructions further causes display of the image via the dynamic security seal based on a preconfigured threshold period of time.

16. The computer-implemented method of claim 14, wherein execution of the dynamic security seal computer-executable instructions further causes performance of one or more additional validations on information associated with the application, wherein the one or more additional validations comprise at least one of validating organization information of an organization associated with the entity, validating recency of vulnerability scanning, validating level of site payment card industry compliance, validating transport layer security checks, validating use of certificate transparency logs for security checks, or validating implementation of a web application firewall and wherein the method further comprises:

causing a modification of the security seal based on the one or more additional validations, wherein the modification includes any of making the security seal larger, bolder, brighter, and changing the color of the security seal.

17. The computer-implemented method of claim 14, wherein receiving dynamic security seal computer-executable instructions comprises receiving computer-executable instructions from the computing device associated with the certificate authority.

18. The computer-implemented method of claim 14, the computer-implemented method further comprising receiving the request, from an organization associated with the application, for the dynamic security seal for the application.

19. The computer-implemented method of claim 14, wherein the validation of the relationship between the image and the entity is based at least in part on a logo record, wherein the logo record comprises a verified mark certificate.

20. The computer-implemented method of claim 14, wherein the validation of the relationship between the image and the entity is based at least in part on a logo record, wherein the logo record indicates the relationship between the image and the entity based at least in part on a trademark database.

21. The computer-implemented method of claim 14, the computer-implemented method further comprising:

receiving additional dynamic security seal computer-executable instructions based on an updated validation of the relationship between the image and the entity;

embedding the additional dynamic security seal computer-executable instructions in the computer-executable instructions of the application;

communicating the computer-executable instructions of the application with the additional dynamic security seal computer-executable instructions embedded therein to the client computing device, wherein execution of the additional dynamic security seal computer-executable instructions causes:

an update to the sequential display of the plurality of faces of the dynamic security seal.

\* \* \* \* \*